US012670831B2

(12) United States Patent
Chen et al.

(10) Patent No.: US 12,670,831 B2
(45) Date of Patent: Jun. 30, 2026

(54) DRIVING CIRCUIT INCLUDING FIRST STORAGE CIRCUIT ELECTRICALLY CONNECTED TO FIRST OUTPUT NODE AND DRIVING SIGNAL OUTPUT TERMINAL

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Wenbo Chen, Beijing (CN); Jingwen Zhang, Beijing (CN); Ziyang Yu, Beijing (CN); Tianyi Cheng, Beijing (CN); Jianpeng Wu, Beijing (CN); Zhiliang Jiang, Beijing (CN); Ming Hu, Beijing (CN); Cong Liu, Beijing (CN); Yonglin Guo, Beijing (CN); Gukhwan Song, Beijing (CN); Haijun Qiu, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 11 days.

(21) Appl. No.: 18/714,911

(22) PCT Filed: Aug. 30, 2023

(86) PCT No.: PCT/CN2023/115728

§ 371 (c)(1),
(2) Date: May 30, 2024

(87) PCT Pub. No.: WO2025/043527

PCT Pub. Date: Mar. 6, 2025

(65) Prior Publication Data

US 2025/0391312 A1 Dec. 25, 2025

(51) Int. Cl.
*G09G 3/20* (2006.01)
*G09G 3/3225* (2016.01)

(52) U.S. Cl.
CPC ......... *G09G 3/2092* (2013.01); *G09G 3/3225* (2013.01); *G09G 2300/0426* (2013.01)

(58) Field of Classification Search
None
See application file for complete search history.

(56) References Cited

U.S. PATENT DOCUMENTS 5,583,359 A * 12/1996 Ng ...................... H01L 23/5223 257/532
2010/0090308 A1* 4/2010 Sardana ................ H10D 1/714 257/532

(Continued)

FOREIGN PATENT DOCUMENTS

CN 108564914 A 9/2018
CN 109147635 A 1/2019

(Continued)

OTHER PUBLICATIONS

Extended European Search Report corresponding to Application No. 23950118.2 dated Feb. 16, 2026, 21 pages.

*Primary Examiner* — Kirk W Hermann
(74) *Attorney, Agent, or Firm* — MUNCY, GEISSLER, OLDS & LOWE, P.C.

(57) ABSTRACT

A driving circuit includes a first output node control circuit, an output reset circuit, a second output node control circuit, an output circuit, a first energy storage circuit, a second energy storage circuit, and a driving signal output terminal; the output reset circuit controls to connect the driving signal output terminal and the first voltage line under the control of the potential of the first output node; the output circuit controls to connect the driving signal output terminal and the second voltage line under the control of the potential of the (Continued)

second output node; the first energy storage circuit is electrically connected to the first output node and the driving signal output terminal respectively, and the second energy storage circuit is electrically connected to the second output node and the second voltage line respectively, and the first/second energy storage circuit are configured to store electric energy.

19 Claims, 18 Drawing Sheets

(56) References Cited

U.S. PATENT DOCUMENTS

| | | | | |
|---|---|---|---|---|
| 2018/0374410 | A1* | 12/2018 | Zhu | G11C 19/28 |
| 2021/0036083 | A1 | 2/2021 | Hao et al. | |
| 2022/0068212 | A1 | 3/2022 | Yao et al. | |
| 2022/0199029 | A1* | 6/2022 | Xiao | G11C 19/28 |
| 2022/0406261 | A1* | 12/2022 | Zhai | G11C 19/28 |

FOREIGN PATENT DOCUMENTS

| | | | | |
|---|---|---|---|---|
| CN | 112687230 | A | 4/2021 | |
| CN | 112802424 | A | 5/2021 | |
| CN | 113362766 | A | 9/2021 | |
| CN | 113851174 | A | 12/2021 | |
| CN | 114999397 | A | 9/2022 | |
| CN | 115548078 | A | 12/2022 | |
| CN | 115631711 | A * | 1/2023 | G09G 3/20 |
| CN | 117831594 | A | 4/2024 | |
| JP | 2007004118 | A | 1/2007 | |
| KR | 10-2022-0093764 | A | 7/2022 | |
| WO | WO-2023/115401 | A1 | 6/2023 | |

* cited by examiner

DRIVING CIRCUIT INCLUDING FIRST STORAGE CIRCUIT ELECTRICALLY CONNECTED TO FIRST OUTPUT NODE AND DRIVING SIGNAL OUTPUT TERMINAL

CROSS REFERENCE TO RELATED APPLICATIONS

The present disclosure is the U.S. national phase entry of PCT Application No. PCT/CN2023/115728 filed on Aug. 30, 2023, the entire contents of which are hereby incorporated by reference.

TECHNICAL FIELD

The present disclosure relates to the field of display technology, in particular to a driving circuit, a driving method and a display device.

BACKGROUND

In the related art, low-temperature polysilicon and oxide hybrid driving have been widely used in high-end organic light-emitting diode (OLED) display panels. When the potential of the driving signal output by the relevant driving circuit is reduced from high voltage to low voltage, there is a two-step pull-down problem. There will be a pull-down step. The potential of the driving signal cannot reach the low voltage state quickly at one time. Highlight horizontal lines will be produced.

SUMMARY

In one aspect, the present disclosure provides in some embodiments a driving circuit, including a first output node control circuit, an output reset circuit, a second output node control circuit, an output circuit, a first energy storage circuit, a second energy storage circuit, and a driving signal output terminal; wherein the first output node control circuit is electrically connected to a first output node and is configured to control a potential of the first output node; the second output node control circuit is electrically connected to a second output node and is configured to control a potential of the second output node; the output reset circuit is electrically connected to the first output node, the driving signal output terminal and a first voltage line respectively, and is configured to control to connect the driving signal output terminal and the first voltage line under the control of the potential of the first output node; the output circuit is electrically connected to the second output node, the driving signal output terminal and a second voltage line respectively, and is configured to control to connect the driving signal output terminal and the second voltage line under the control of the potential of the second output node; the first energy storage circuit is electrically connected to the first output node and the driving signal output terminal respectively, and the second energy storage circuit is electrically connected to the second output node and the second voltage line respectively, and the first energy storage circuit and the second energy storage circuit are configured to store electric energy.

Optionally, the first energy storage circuit includes a first capacitor; a first electrode plate of the first capacitor is electrically connected to the first output node, and a second electrode plate of the first capacitor is electrically connected to the driving signal output terminal; the second energy storage circuit includes a sixth capacitor; a first electrode plate of the sixth capacitor is electrically connected to the second output node, and a second electrode plate of the sixth capacitor is electrically connected to the second voltage line.

Optionally, the first energy storage circuit includes a second capacitor and a third capacitor; a first electrode plate of the second capacitor is electrically connected to the first output node, and a second electrode plate of the second capacitor is electrically connected to a connection node; a first electrode plate of the third capacitor is electrically connected to the connection node, and a second electrode plate of the third capacitor is electrically connected to the driving signal output terminal.

Optionally, the first energy storage circuit includes a first capacitor, a second capacitor and a third capacitor; a first electrode plate of the first capacitor is electrically connected to the first output node, and a second electrode plate of the first capacitor is electrically connected to the driving signal output terminal; a first electrode plate of the second capacitor is electrically connected to the first output node, and a second electrode plate of the second capacitor is electrically connected to a connection node; a first electrode plate of the third capacitor is electrically connected to the connection node, and a second electrode plate of the third capacitor is electrically connected to the driving signal output terminal.

Optionally, the driving circuit includes a connection node control circuit; wherein the connection node control circuit is respectively connected to the first node, the second voltage line, a first node of an adjacent previous stage, the connection node, the second node, a first clock signal line, the second output node and the first output node, is configured to control to connect or disconnect the connection node and the second voltage line under the control of a potential of the first node and a potential of the first node of the adjacent previous stage, control to connect or disconnect the connection node and the second node under the control of a first clock signal provided by the first clock signal line, and control to connect or disconnect the connection node and the second node under the control of the potential of the second output node, and control to connect or disconnect the second node and the first clock signal line under the control of the potential of the first output node.

Optionally, the connection node control circuit includes a first transistor, a second transistor, a third transistor, a fourth transistor and a fifth transistor; a gate electrode of the first transistor is electrically connected to the first node, a first electrode of the first transistor is electrically connected to the second voltage line, and a second electrode of the first transistor is electrically connected to a first electrode of the third transistor; a gate electrode of the second transistor is electrically connected to the first output node, a first electrode of the second transistor is electrically connected to the second node, and a second electrode of the second transistor is electrically connected to the first clock signal line; a gate electrode of the third transistor is electrically connected to the first node of the adjacent previous stage, and a second electrode of the third transistor is electrically connected to the connection node; a gate electrode of the fourth transistor is electrically connected to the first clock signal line, a first electrode of the fourth transistor is electrically connected to the connection node, and a second electrode of the fourth transistor is electrically connected to the second node; a gate electrode of the fifth transistor is electrically connected to the second output node, a first electrode of the fifth transistor is electrically connected to the connection node, and a second electrode of the fifth transistor is electrically connected to the second node; the first output node control circuit includes a sixth transistor; a gate electrode of the sixth transistor is electrically connected to the second clock signal line, a first electrode of the sixth transistor is electrically connected to an input terminal, and a second electrode of the sixth transistor is electrically connected to the first output node.

Optionally, the first output node control circuit is also connected to a first node, a second voltage line, a third node, a first clock signal line, a fourth node, an input terminal and a second clock signal line respectively, is configured to control to connect or disconnect the third node and the second voltage line under the control of a potential of the first node, control to connect or disconnect the third node and the first clock signal line under the control of a potential of the fourth node, control the potential of the fourth node according to the potential of the third node, and control to connect or disconnect the input terminal and the first output node under the control of a second clock signal provided by the second clock signal line, control to connect or disconnect the input terminal and the fourth node under the control of the second clock signal, and control the potential of the first output node under the control of the potential of the fourth node.

Optionally, the first output node control circuit includes a first transistor, a second transistor, a fourth capacitor, a sixth transistor, a seventh transistor and an eighth transistor; a gate electrode of the first transistor is electrically connected to the first node, a first electrode of the first transistor is electrically connected to the second voltage line, and a second electrode of the first transistor is electrically connected to the third node; a gate electrode of the second transistor is electrically connected to the fourth node, a first electrode of the second transistor is electrically connected to the third node, and a second electrode of the second transistor is electrically connected to the first clock signal line; a first electrode plate of the fourth capacitor is electrically connected to the third node, and a second electrode plate of the fourth capacitor is electrically connected to the fourth node; a gate electrode of the sixth transistor is electrically connected to the second clock signal line, a first electrode of the sixth transistor is electrically connected to the input terminal, and a second electrode of the sixth transistor is electrically connected to the first output node; a gate electrode of the seventh transistor is electrically connected to the second clock signal line, a first electrode of the seventh transistor is electrically connected to the input terminal, and a second electrode of the seventh transistor is electrically connected to the fourth node; a gate electrode of the eighth transistor and a first electrode of the eighth transistor are electrically connected to the fourth node, and a second electrode of the eighth transistor is electrically connected to the first output node.

Optionally, the first output node control circuit further includes a ninth transistor; a second electrode of the seventh transistor is electrically connected to the fourth node through the ninth transistor; a gate electrode of the ninth transistor is electrically connected to the third voltage line, a first electrode of the ninth transistor is electrically connected to the second electrode of the seventh transistor, and a second electrode of the ninth transistor is electrically connected to the fourth node.

Optionally, the first output node control circuit further includes a tenth transistor; the second electrode of the sixth transistor is electrically connected to the first output node through the tenth transistor; a gate electrode of the tenth transistor is electrically connected to the third voltage line, a first electrode of the tenth transistor is electrically connected to a fifth node, and a second electrode of the tenth transistor is electrically connected to the first output node; the second electrode of the sixth transistor is electrically connected to the fifth node.

Optionally, the driving circuit includes a first node control circuit; wherein the first node control circuit is electrically connected to a first node, a second clock signal line, a first voltage line and the first output node respectively, and is configured to control to connect or disconnect the first node and the first voltage line under the control of the second clock signal provided by the second clock signal line, and control to connect or disconnect the first node and the second clock signal line under the control of the first output node.

Optionally, the first node control circuit includes an eleventh transistor and a twelfth transistor; a gate electrode of the eleventh transistor is electrically connected to the second clock signal line, a first electrode of the eleventh transistor is electrically connected to the first voltage line, and a second electrode of the eleventh transistor is electrically connected to the first node; a gate electrode of the twelfth transistor is electrically connected to the first output node, a first electrode of the twelfth transistor is electrically connected to the second clock signal line, and a second electrode of the twelfth transistor is electrically connected to the first node.

Optionally, the second output node control circuit is also electrically connected to the first node, the first clock signal line, a sixth node, the second voltage line and the first output node respectively, is configured to control to connect or disconnect the sixth node and the first clock signal line under the control of the potential of the first node, control the potential of the sixth node according to the potential of the first node, control to connect the sixth node and the second output node and maintain the potential of the second output node under the control of the first clock signal provided by the first clock signal line, and control to connect or disconnect the second output node and the second voltage line under the control of the potential of the first output node.

Optionally, the second output node control circuit includes a thirteenth transistor, a fourteenth transistor, a fifth capacitor and a fifteenth transistor; a gate electrode of the thirteenth transistor is electrically connected to the first node, a first electrode of the thirteenth transistor is electrically connected to the first clock signal line, and a second electrode of the thirteenth transistor is electrically connected to the sixth node; a gate electrode of the fourteenth transistor is electrically connected to the first clock signal line, a first electrode of the fourteenth transistor is electrically connected to the sixth node, and a second electrode of the fourteenth transistor is electrically connected to the second output node; a first electrode plate of the fifth capacitor is electrically connected to the gate electrode of the thirteenth transistor, and a second electrode plate of the fifth capacitor is electrically connected to the sixth node; a gate electrode of the fifteenth transistor is electrically connected to the first output node, a first electrode of the fifteenth transistor is electrically connected to the second output node, and a second electrode of the fifteenth transistor is electrically connected to the second voltage line.

Optionally, the first output node control circuit includes a sixteenth transistor; a gate electrode of the sixteenth transistor is electrically connected to the control signal line, a first electrode of the sixteenth transistor is electrically connected to the second voltage line, and a second electrode of the sixteenth transistor is electrically connected to the first output node.

Optionally, the driving circuit further includes a seventeenth transistor; wherein the first node is electrically connected to the gate electrode of the thirteenth transistor through the seventeenth transistor; a gate electrode of the seventeenth transistor is electrically connected to the third voltage line, a first electrode of the seventeenth transistor is electrically connected to the first node, and a second electrode of the seventeenth transistor is electrically connected to the gate electrode of thirteenth transistor.

Optionally, the output circuit includes an output transistor, and the output reset circuit includes an output reset transistor; a gate electrode of the output transistor is electrically connected to the second output node, a first electrode of the output transistor is electrically connected to the second voltage line, and a second electrode of the output transistor is electrically connected to the driving signal output terminal; a gate electrode of the output reset transistor is electrically connected to the first output node, a first electrode of the output reset transistor is electrically connected to the driving signal output terminal, and a second electrode of the output reset transistor is electrically connected to the first voltage line.

Optionally, the first capacitor includes a first electrode plate and a second electrode plate; the first electrode plate includes a first electrode plate part and a second electrode plate part that are electrically connected to each other; the first electrode plate part is formed on a first metal layer, the second electrode plate is formed on a second metal layer, the second electrode plate part is formed on a third metal layer, and the second metal layer is arranged between the first metal layer and the third metal layer; the sixth capacitor includes a first electrode plate and a second electrode plate; the first electrode plate of the sixth capacitor is formed on the first metal layer, and the second electrode plate of the sixth capacitor is formed on a fifth metal layer.

Optionally, the first metal layer is a first gate metal layer, the second metal layer is a first source-drain metal layer, the third metal layer is a second source-drain metal layer, and the fifth metal layer is a second gate metal layer.

Optionally, the first capacitor includes a first electrode plate and a second electrode plate; the sixth capacitor includes a first electrode plate and a second electrode plate; the first electrode plate of the first capacitor is formed on a fourth metal layer, and the second electrode plate of the first capacitor is formed on a fifth metal layer; the first electrode plate of the sixth capacitor is formed on the fourth metal layer, and the second electrode plate of the sixth capacitor is formed on the fifth metal layer.

Optionally, the fourth metal layer is a first gate metal layer, and the fifth metal layer is a second gate metal layer.

In a second aspect, an embodiment of the present disclosure provides a driving method, applied to the driving circuit, the driving method includes: controlling, by the first output node control circuit, the potential of the first output node; controlling, by the second output node control circuit, the potential of the second output node; controlling, by the output reset circuit, to connect the driving signal output terminal and the first voltage line under the control of the potential of the first output node; controlling, by the output circuit, to connect the driving signal output terminal and the second voltage line under the control of the potential of the second output node; controlling, by the first energy storage circuit, the potential of the first output node according to a driving signal provided by the driving signal output terminal; maintaining, by the second energy storage circuit, the potential of the second output node.

In a third aspect, an embodiment of the present disclosure provides a display device including the driving circuit.

DETAILED DESCRIPTION

The technical solutions in the embodiments of the present disclosure will be clearly and completely described below with reference to the accompanying drawings in the embodiments of the present disclosure. Obviously, the described embodiments are only some of the embodiments of the present disclosure, rather than all of the embodiments. Based on the embodiments in the present disclosure, all other embodiments obtained by those of ordinary skill in the art without creative work fall within the scope of protection of the present disclosure.

The transistors used in all embodiments of the present disclosure may be thin film transistors, field effect transistors, or other devices with the same characteristics. In the embodiment of the present disclosure, in order to distinguish the two electrodes of the transistor except the gate electrode, one electrode is called the first electrode and the other electrode is called the second electrode.

In actual operation, when the transistor is a thin film transistor or a field effect transistor, the first electrode may be a drain electrode, and the second electrode may be a source electrode; or, the first electrode may be a source electrode, the second electrode may be a drain electrode.

Figure 1:
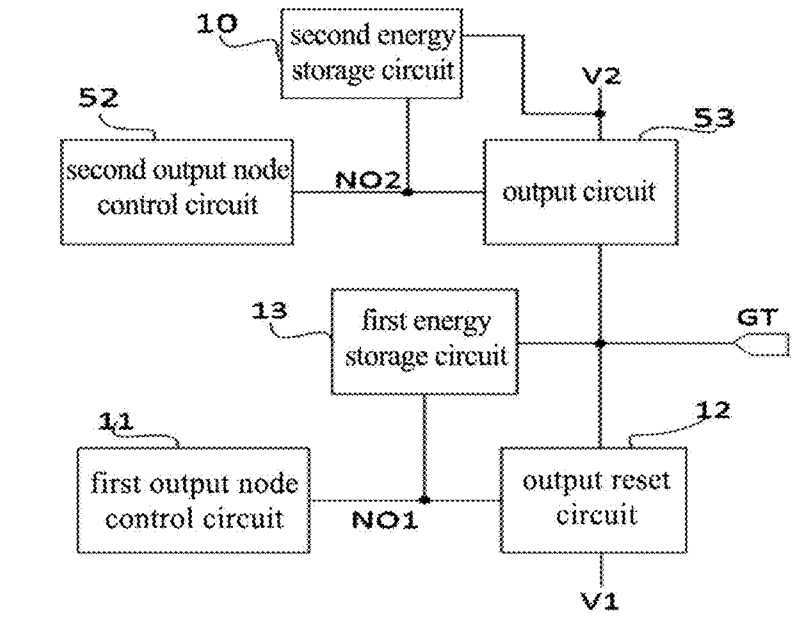
FIG. 1 is a structural diagram of a driving circuit according to at least one embodiment of the present disclosure.

As shown in FIG. 1, the driving circuit according to the embodiment of the present disclosure includes a first output node control circuit 11, an output reset circuit 12, a second output node control circuit 52, an output circuit 53, a first energy storage circuit 13, a second energy storage circuit 10, and driving signal output terminal GT;

The first output node control circuit 11 is electrically connected to the first output node NO1 and is configured to control the potential of the first output node NO1;

The second output node control circuit 52 is electrically connected to the second output node NO2 and is configured to control the potential of the second output node NO2;

The output reset circuit 12 is electrically connected to the first output node NO1, the driving signal output terminal GT and the first voltage line V1 respectively, and is configured to control to connect the driving signal output terminal GT and the first voltage line V1 under the control of the potential of the first output node NO1;

The output circuit 53 is electrically connected to the second output node NO2, the driving signal output terminal GT and the second voltage line V2 respectively, and is configured to control to connect the driving signal output terminal GT and the second voltage line V2 under the control of the potential of the second output node NO2;

The first energy storage circuit 13 is electrically connected to the first output node NO and the driving signal output terminal (GT respectively, and is configured to store electrical energy;

The second energy storage circuit 10 is electrically connected to the second output node NO2 and the second voltage line V2 respectively, and is configured to store electric energy.

The driving circuit described in the embodiment of the present disclosure strengthens the pull-down capability of the output reset transistor included in the output reset circuit 12 by adding a first energy storage circuit 13 between the first output node NO1 and the driving signal output terminal GT, to achieve the purpose of pulling down the potential of the driving signal provided by the driving signal output terminal GT more thoroughly, so as to make the first pull-down of the potential of the driving signal closer to the low level, to turn off the transistor in the pixel circuit whose gate electrode electrically connected to the driving signal output terminal CT faster, reduce the negative impact caused by two pull-downs when the potential of the driving signal switches from high level to low level.

In at least one embodiment of the present disclosure, the first voltage line may be a low voltage line.

Optionally, the first energy storage circuit includes a first capacitor;

A first electrode plate of the first capacitor is electrically connected to the first output node, and a second electrode plate of the first capacitor is electrically connected to the driving signal output terminal;

The second energy storage circuit includes a sixth capacitor;

a first electrode plate of the sixth capacitor is electrically connected to the second output node, and a second electrode plate of the sixth capacitor is electrically connected to the second voltage line.

In specific implementation, the first energy storage circuit may include a first capacitor, and the first capacitor is connected between the first output node and the driving signal output terminal.

Optionally, the first energy storage circuit includes a second capacitor and a third capacitor;

a first electrode plate of the second capacitor is electrically connected to the first output node, and a second electrode plate of the second capacitor is electrically connected to a connection node;

a first electrode plate of the third capacitor is electrically connected to the connection node, and a second electrode plate of the third capacitor is electrically connected to the driving signal output terminal.

In specific implementation, the first energy storage circuit may include a second capacitor and a third capacitor. The second capacitor and the third capacitor are connected in series. The second capacitor and the third capacitor are arranged between the first output node and the driving signal output terminal, the node between the second capacitor and the third capacitor is the connection node.

Optionally, the first energy storage circuit includes a first capacitor, a second capacitor and a third capacitor;

a first electrode plate of the first capacitor is electrically connected to the first output node, and a second electrode plate of the first capacitor is electrically connected to the driving signal output terminal;

a first electrode plate of the second capacitor is electrically connected to the first output node, and a second electrode plate of the second capacitor is electrically connected to the connection node;

a first electrode plate of the third capacitor is electrically connected to the connection node, and a second electrode plate of the third capacitor is electrically connected to the driving signal output terminal.

In specific implementation, the first energy storage circuit may include a first capacitor, a second capacitor and a third capacitor. The first capacitor is connected between the first output node and the driving signal output terminal. The second capacitor and the third capacitor are connected in series with each other, the second capacitor and the third capacitor are arranged between the first output node and the driving signal output terminal, and the node between the second capacitor and the third capacitor is the connection node.

The driving circuit according to at least one embodiment of the present disclosure further includes a connection node control circuit;

The connection node control circuit is respectively connected to the first node, the second voltage line, the first node of the adjacent previous stage, the connection node, the second node, the first clock signal line, the second output node and the first output node, is configured to control to connect or disconnect the connection node and the second voltage line under the control of the potential of the first node and the potential of the first node of the adjacent previous stage, control to connect or disconnect the connection node and the second node under the control of the first clock signal provided by the first clock signal line, and control to connect or disconnect the connection node and the second node under the control of the potential of the second output node, and control to connect or disconnect the second node and the first clock signal line under the control of the potential of the first output node.

In specific implementation, the driving circuit may further include a connection node control circuit for controlling the potential of the connection node. The connection node control circuit controls to connect or disconnect the connection node and the second voltage line under the control of a potential of the first node and a potential of the first node of the adjacent previous stage, controls to connect or disconnect the connection node and the second node under the control of the first clock signal, controls to connect or disconnect the connection node and the second node under the control of the potential of the second output node, and controls to connect or disconnect the second node and the first clock signal line under the control of the potential of the first output node.

Optionally, the second voltage line may be a high voltage line.

Figure 2:
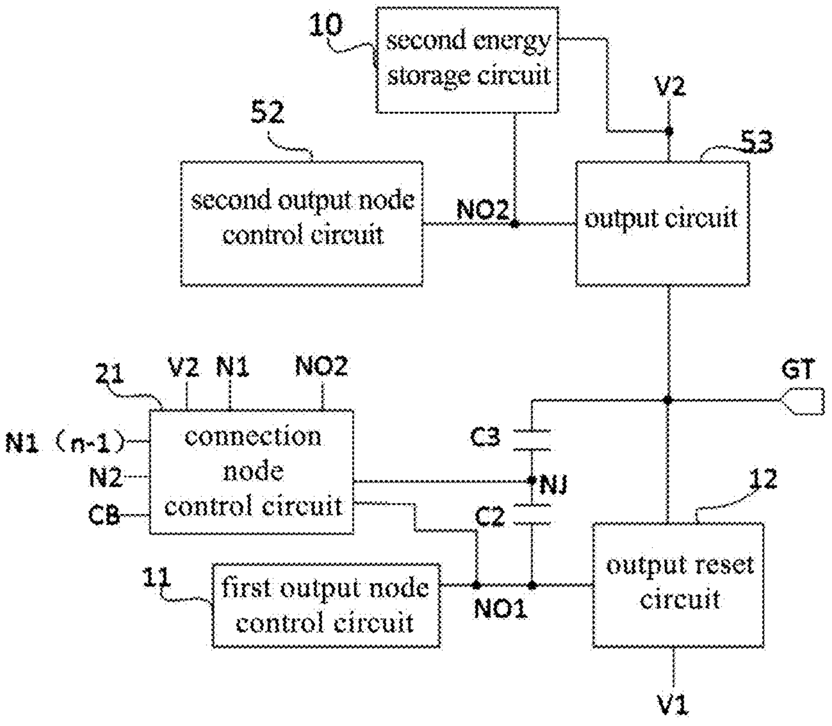
FIG. 2 is a structural diagram of a driving circuit according to at least one embodiment of the present disclosure.

As shown in FIG. 2, based on at least one embodiment of the driving circuit shown in FIG. 1, The first energy storage circuit includes a second capacitor C2 and a third capacitor C3;

The first electrode plate of the second capacitor C2 is electrically connected to the first output node NO1, and the second electrode plate of the second capacitor C2 is electrically connected to the connection node NJ;

The first electrode plate of the third capacitor C3 is electrically connected to the connection node NJ, and the second electrode plate of the third capacitor C3 is electrically connected to the driving signal output terminal GT;

The driving circuit according to at least one embodiment of the present disclosure further includes a connection node control circuit 21;

The connection node control circuit 21 is respectively connected to the first node N1, the second voltage line V2 the first node N1 (n−1) of the adjacent previous stage, the connection node NJ, the second node N2, and the first clock signal line CB, the second output node NO2 and the first output node NO1, is configured to control to connect or disconnect the connection node NJ and the second voltage line V2 under the control of the potential of the first node N1 and the potential of the first node N1 (n−1) of the adjacent previous stage, control to connect or disconnect the connection node NJ and the second node N2 under the control of the first clock signal provided by the first clock signal line CB, control to connect or disconnect the connection node NJ and the second node N2 under the control of the potential of the second output node NO2, and control to connect or disconnect the second node N2 and the first clock signal line CB under the control of the potential of the first output node NO1.

In specific implementation, when the first energy storage circuit 13 includes the second capacitor C2 and the third capacitor C3, the driving circuit according to at least one embodiment of the present disclosure also includes a connection node control circuit 21. During the period when the potential of the driving signal is pulled down, the second voltage signal provided by the second voltage line is not written into the connection node NJ, so that the first clock signal provided by the first clock signal line is not written into the connection node NJ, The connection node NJ is in a floating state during the time period when the potential of the driving signal is pulled down, and by using capacitance characteristics of the third capacitor C3, during the time period when the potential of the driving signal is pulled down, the potential of the connection node NJ is pulled down, thereby eliminating the falling edge step of the driving signal.

Figure 3:
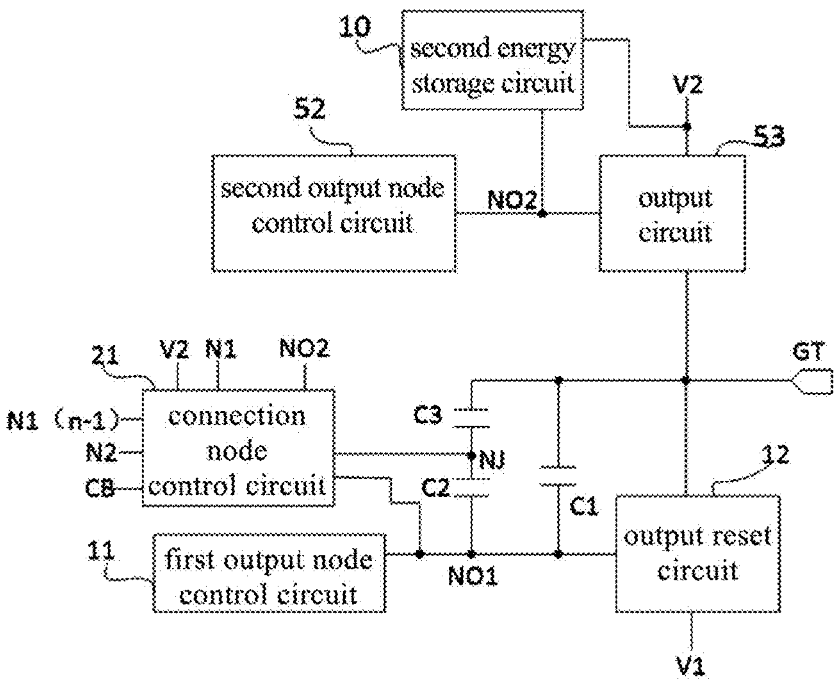
FIG. 3 is a structural diagram of a driving circuit according to at least one embodiment of the present disclosure.

As shown in FIG. 3, based on at least one embodiment of the driving circuit shown in FIG. 2, the first energy storage circuit may further include a first capacitor C1;

The first electrode plate of the first capacitor C1 is electrically connected to the first output node NO1, and the second electrode plate of the first capacitor C1 is electrically connected to the driving signal output terminal GT.

Optionally, the connection node control circuit includes a first transistor, a second transistor, a third transistor, a fourth transistor and a fifth transistor;

a gate electrode of the first transistor is electrically connected to the first node, a first electrode of the first transistor is electrically connected to the second voltage line, and a second electrode of the first transistor is electrically connected to a first electrode of the third transistor;

a gate electrode of the second transistor is electrically connected to the first output node, a first electrode of the second transistor is electrically connected to the second node, and a second electrode of the second transistor is electrically connected to the first clock signal line;

a gate electrode of the third transistor is electrically connected to the first node of the adjacent previous stage, and a second electrode of the third transistor is electrically connected to the connection node;

a gate electrode of the fourth transistor is electrically connected to the first clock signal line, a first electrode of the fourth transistor is electrically connected to the connection node, and a second electrode of the fourth transistor is electrically connected to the second node;

a gate electrode of the fifth transistor is electrically connected to the second output node, a first electrode of the fifth transistor is electrically connected to the connection node, and a second electrode of the fifth transistor is electrically connected to the second node;

The first output node control circuit includes a sixth transistor;

a gate electrode of the sixth transistor is electrically connected to the second clock signal line, a first electrode of the sixth transistor is electrically connected to the input terminal, and a second electrode of the sixth transistor is electrically connected to the first output node.

In at least one embodiment of the present disclosure, the first output node control circuit is also connected to the first node, the second voltage line, the third node, the first clock signal line, the fourth node, the input terminal and the second clock signal line respectively, is configured to control to connect or disconnect the third node and the second voltage line under the control of the potential of the first node, control to connect or disconnect the third node and the first clock signal line under the control of the potential of the fourth node, control the potential of the fourth node according to the potential of the third node, and control to connect or disconnect the input terminal and the first output node under the control of the second clock signal provided by the second clock signal line, control to connect or disconnect the input terminal and the fourth node under the control of the second clock signal, and control the potential of the first output node under the control of the potential of the fourth node.

In specific implementation, the first output node control circuit may control to connect or disconnect the third node and the second voltage line under the control of the potential of the first node, control to connect or disconnect the third node and the first clock signal line under the control of the potential of the fourth node, control the potential of the fourth node according to the potential of the third node, and control to connect or disconnect the input terminal and the first output node under the control of the second clock signal, control to connect or disconnect the input terminal and the fourth node under the control of the second clock signal, control the potential of the first output node under the control of the potential of the fourth node.

Optionally, the second voltage line may be a high voltage line.

Figure 4:
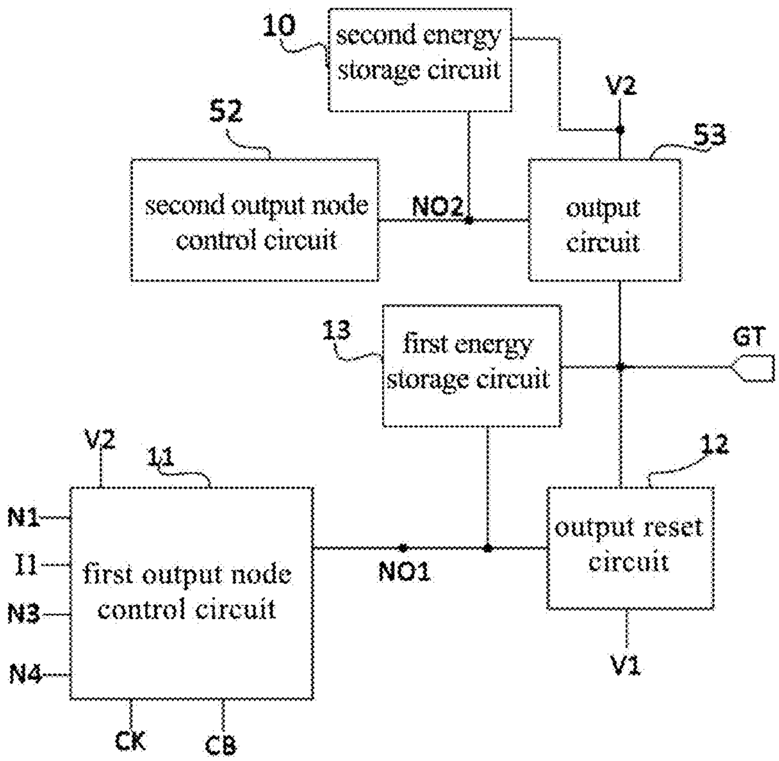
FIG. 4 is a structural diagram of a driving circuit according to at least one embodiment of the present disclosure.

As shown in FIG. 4, based on at least one embodiment of the driving circuit shown in FIG. 1, The first output node control circuit 11 is also connected to the first node N, the second voltage line V2, the third node N3, the first clock signal line CB, the fourth node N4, the input terminal I1 and the second clock signal line CK respectively, is configured to control to connect or disconnect the third node N3 and the second voltage line V2 under the control of the potential of the first node N1, control to connect or disconnect the third node N3 and the first clock signal line CB under the control of the potential of the fourth node N4, control the potential of the fourth node N4 according to the potential of the third node N3, control to connect or disconnect the input terminal I1 and the first output node NO1 under the control of the second clock signal provided by the second clock signal line CK, control to connect or disconnect the input terminal I1 and the fourth node N4 under the control of the second clock signal, and control the potential of the first output node NO1 under the control of the potential of the fourth node N4.

Optionally, the first output node control circuit includes a first transistor, a second transistor, a fourth capacitor, a sixth transistor, a seventh transistor and an eighth transistor;

a gate electrode of the first transistor is electrically connected to the first node, a first electrode of the first transistor is electrically connected to the second voltage line, and a second electrode of the first transistor is electrically connected to the third node;

a gate electrode of the second transistor is electrically connected to the fourth node, a first electrode of the second transistor is electrically connected to the third node, and a second electrode of the second transistor is electrically connected to the first clock signal line;

a first electrode plate of the fourth capacitor is electrically connected to the third node, and a second electrode plate of the fourth capacitor is electrically connected to the fourth node;

a gate electrode of the sixth transistor is electrically connected to the second clock signal line, a first electrode of the sixth transistor is electrically connected to the input terminal, and a second electrode of the sixth transistor is electrically connected to the first output node;

a gate electrode of the seventh transistor is electrically connected to the second clock signal line, a first electrode of the seventh transistor is electrically connected to the input terminal, and a second electrode of the seventh transistor is electrically connected to the fourth node;

a gate electrode of the eighth transistor and a first electrode of the eighth transistor are electrically connected to the fourth node, and a second electrode of the eighth transistor is electrically connected to the first output node.

In the driving circuit according to at least one embodiment of the present disclosure, the first output node control circuit further includes a ninth transistor;

a second electrode of the seventh transistor is electrically connected to the fourth node through the ninth transistor;

a gate electrode of the ninth transistor is electrically connected to the third voltage line, a first electrode of the ninth transistor is electrically connected to the second electrode of the seventh transistor, and a second electrode of the ninth transistor is electrically connected to the fourth node, In at least one embodiment of the present disclosure, when the ninth transistor is a p-type transistor, the third voltage line is a low voltage line.

In the driving circuit according to at least one embodiment of the present disclosure, the first output node control circuit further includes a tenth transistor;

The second electrode of the sixth transistor is electrically connected to the first output node through the tenth transistor;

a gate electrode of the tenth transistor is electrically connected to the third voltage line, a first electrode of the tenth transistor is electrically connected to the fifth node, and a second electrode of the tenth transistor is electrically connected to the first output node;

The second electrode of the sixth transistor is electrically connected to the fifth node.

In at least one embodiment of the present disclosure, when the tenth transistor is a p-type transistor, the third voltage line is a low voltage line.

In specific implementation, the first output node control circuit may include a first transistor, a second transistor, a fourth capacitor, a sixth transistor, a seventh transistor, an eighth transistor, a ninth transistor and a tenth transistor;

After the potential of the input signal provided by the input terminal changes from high to low, the potential of the second clock signal jumps from high voltage to low voltage, and the input signal is written into the first output node and the fourth node. Since the low voltage value of the second clock signal is −7V, after passing through the sixth transistor, due to the threshold voltage loss, the potential of the first output node is −4.5V. Due to the threshold voltage loss of the seventh transistor and the ninth transistor, the potential of the fourth node is −2.5V. At this time, the second output node is written into a high voltage signal, and the output transistor included in the output circuit is turned off; since the tenth transistor is always turned on and the eighth transistor is a transistor with a diode connection structure, as the potential of the first output node gradually becomes negative, and the low-voltage signal is output through the output reset transistor included in the output reset circuit. Since the width-to-length of the channel of the output reset transistor is relatively large, the potential of the first output node will be gradually lowered through the bootstrap effect, the bootstrap effect is enhanced by increasing the capacitance between the gate electrode and drain electrode of the output reset transistor, so that at this stage, the potential of the first output node reaches a lower potential.

Optionally, the channel width of the output reset transistor may be greater than or equal to 30 μm, and the channel length of the output reset transistor may be less than or equal to 6 Lim, but is not limited thereto.

The driving circuit according to at least one embodiment of the present disclosure further includes a first node control circuit;

The first node control circuit is electrically connected to a first node, a second clock signal line, a first voltage line and the first output node respectively, and is configured to control to connect or disconnect the first node and the first voltage line under the control of the second clock signal provided by the second clock signal line, and control to connect or disconnect the first node and the second clock signal line under the control of the first output node.

In specific implantation, the driving circuit may further include a first node control circuit. The first node control circuit controls to connect or disconnect the first node and the first voltage line under the control of the second clock signal, control to connect or disconnect the first node and the second clock signal line under the control of the first output node.

Optionally, the first node control circuit includes an eleventh transistor and a twelfth transistor;

a gate electrode of the eleventh transistor is electrically connected to the second clock signal line, a first electrode of the eleventh transistor is electrically connected to the first voltage line, and a second electrode of the eleventh transistor is electrically connected to the first node;

a gate electrode of the twelfth transistor is electrically connected to the first output node, a first electrode of the twelfth transistor is electrically connected to the second clock signal line, and a second electrode of the twelfth transistor is electrically connected to the first node.

In the driving circuit according to at least one embodiment of the present disclosure, The second output node control circuit is also electrically connected to the first node, the first clock signal line, the sixth node, the second voltage line and the first output node respectively, is configured to control to connect or disconnect the sixth node and the first clock signal line under the control of the potential of the first node, control the potential of the sixth node according to the potential of the first node, control to connect the sixth node and the second output node and maintain the potential of the second output node under the control of the first clock signal provided by the first clock signal line, and control to connect or disconnect the second output node and the second voltage line under the control of the potential of the first output node.

Optionally, the second voltage line may be a high voltage line.

Figure 5:
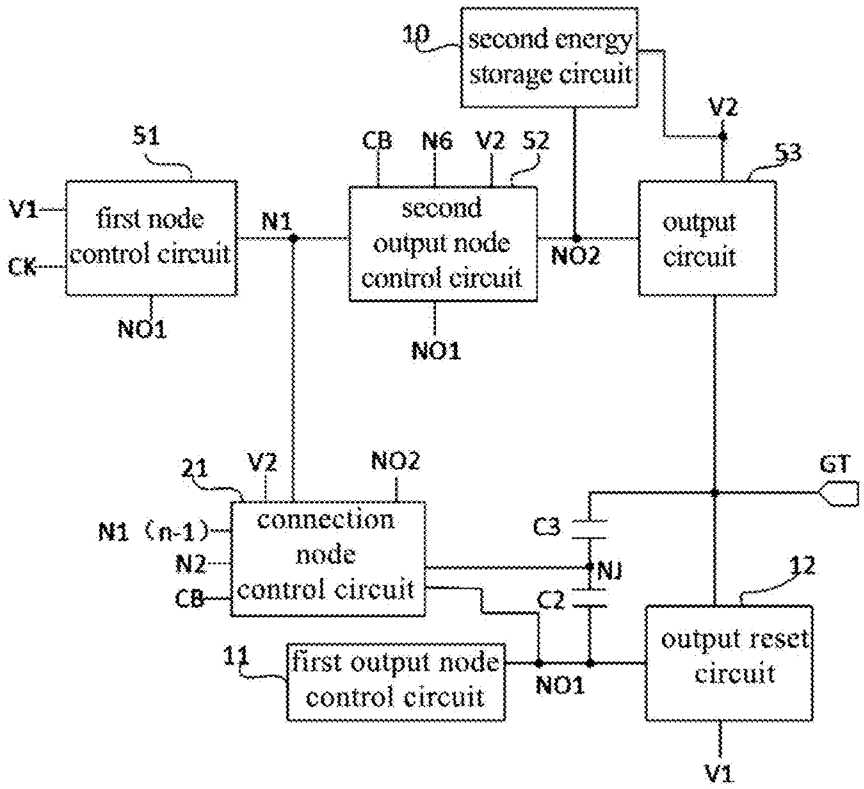
FIG. 5 is a structural diagram of a driving circuit according to at least one embodiment of the present disclosure.

As shown in FIG. 5, based on at least one embodiment of the driving circuit shown in FIG. 2, the driving circuit according to at least one embodiment of the present disclosure ray further include a first node control circuit 51; the first node control circuit 51 is electrically connected to the first node N1 and the second clock signal line CK, the first voltage line V1 and the first output node NO1 respectively, and is configured to control to connect or disconnect the first node N1 and the first voltage line V1 under the control of the second clock signal provided by the second clock signal line CK, and control to connect or disconnect the first node N1 and the second clock signal line CK under the control of the first output node NO1;

The second output node control circuit 52 is also electrically connected to the first node N1, the first clock signal line CB, the sixth node N6, the second voltage line V2 and the first output node NO1 respectively, is configured to control to connect or disconnect the sixth node N6 and the first clock signal line CB under the control of the potential of the first node N1, control the potential of the sixth node N6 according to the potential of the first node N1, control to connect the sixth node N6 and the second output node NO2 under the control of the first clock signal provided by the first clock signal line CB, and is configured to maintain the potential of the second output node NO2, control to connect or disconnect the second output node NO2 and the second voltage line V2 under the control of the potential of the first output node NO1.

Figure 6:
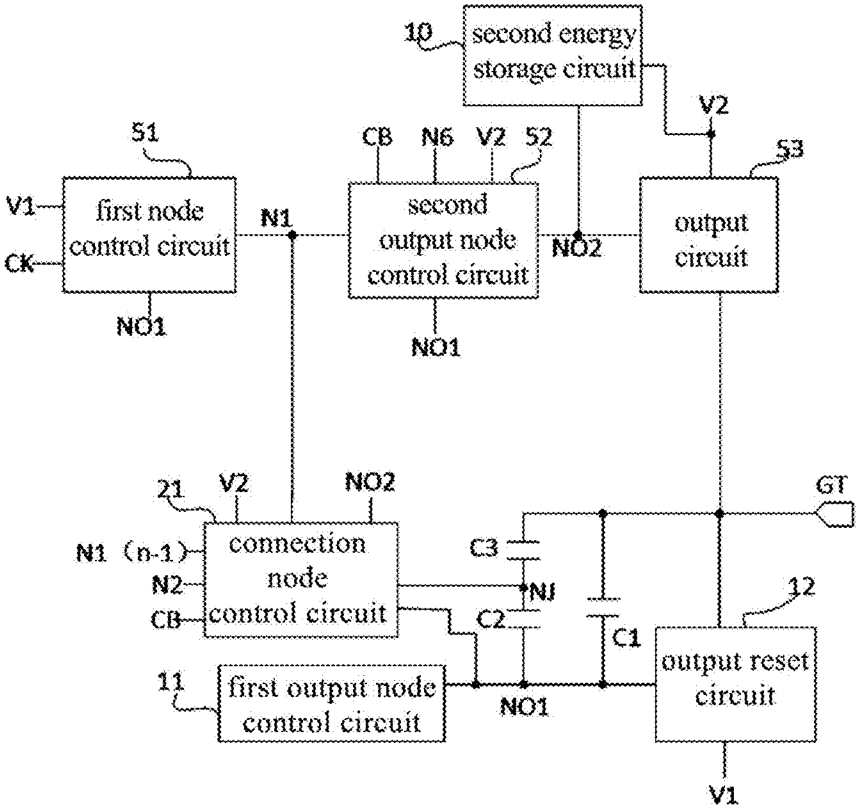
FIG. 6 is a structural diagram of a driving circuit according to at least one embodiment of the present disclosure.

As shown in FIG. 6, based on at least one embodiment of the driving circuit shown in FIG. 3, the driving circuit described in at least one embodiment of the present disclosure may further include a first node control circuit 51;

The first node control circuit 51 is electrically connected to the first node N1 and the second clock signal line CK, the first voltage line V1 and the first output node NO1 respectively, and is configured to control to connect or disconnect the first node N1 and the first voltage line V1 under the control of the second clock signal provided by the second clock signal line CK, can control to connect or disconnect the first node N1 and the second clock signal lines CK under the control of the first output node NO1;

The second output node control circuit 52 is also electrically connected to the first node N, the first clock signal line CB, the sixth node N6, the second voltage line V2 and the first output node NO1 respectively, is configured to control to connect or disconnect the sixth node N6 and the first clock signal line CB under the control of the potential of the first node N1, control the potential of the sixth node N6 according to the potential of the first node N1, control to connect the sixth node N6 and the second output node NO2 under the control of the first clock signal provided by the first clock signal line CB, and is configured to maintain the potential of the second output node NO2, control to connect or disconnect the second output node NO2 and the second voltage line V2 under the control of the potential of the first output node NO1.

Figure 7:
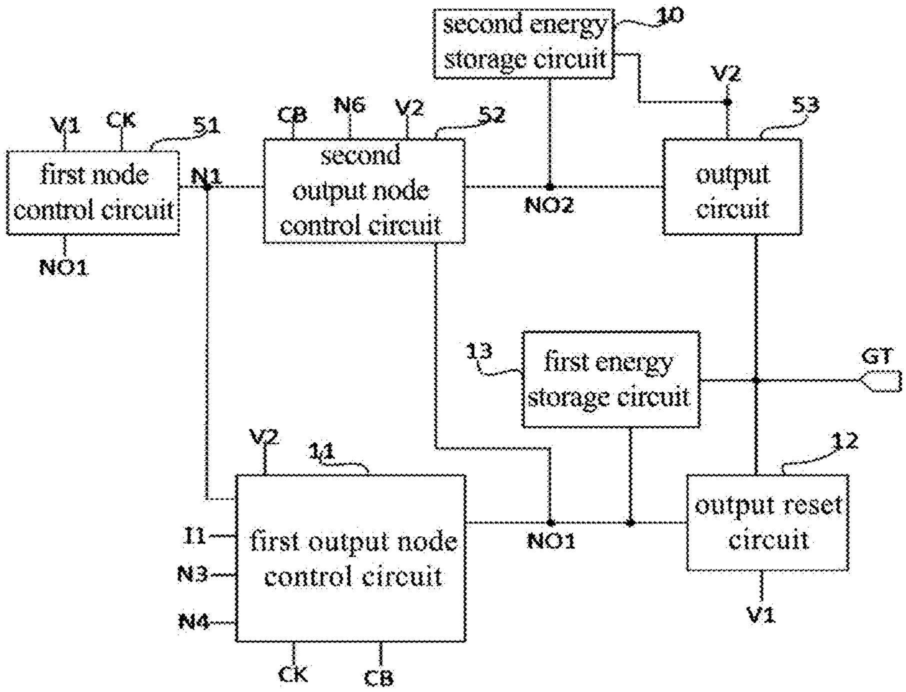
FIG. 7 is a structural diagram of a driving circuit according to at least one embodiment of the present disclosure.

As shown in FIG. 7, based on at least one embodiment of the driving circuit shown in FIG. 4, the driving circuit described in at least one embodiment of the present disclosure may further include a first node control circuit 51;

The first node control circuit 51 is electrically connected to the first node N1 and the second clock signal line CK, the first voltage line V1 and the first output node NO1 respectively, and is configured to control to connect or disconnect the first node N1 and the first voltage line V1 under the control of the second clock signal provided by the second clock signal line CK, control to connect or disconnect the first node N1 and the second clock signal line CK under the control of the first output node NO1;

The second output node control circuit 52 is also electrically connected to the first node N1, the first clock signal line CB, the sixth node N6, the second voltage line V2 and the first output node NO1 respectively, is configured to control to connect or disconnect the sixth node N6 and the first clock signal line CB under the control of the potential of the first node N1, control the potential of the sixth node N6 according to the potential of the first node N1, control to connect the sixth node N6 and the second output node NO2 under the control of the first clock signal provided by the first clock signal line CB, and is configured to maintain the potential of the second output node NO2, controls to connect or disconnect the second output node NO2 and the second voltage line V2 under the control of the potential of the first output node NO1.

Optionally, the second output node control circuit includes a thirteenth transistor, a fourteenth transistor, a fifth capacitor and a fifteenth transistor;

a gate electrode of the thirteenth transistor is electrically connected to the first node, a first electrode of the thirteenth transistor is electrically connected to the first clock signal line, and a second electrode of the thirteenth transistor is electrically connected to the sixth node;

a gate electrode of the fourteenth transistor is electrically connected to the first clock signal line, a first electrode of the fourteenth transistor is electrically connected to the sixth node, and a second electrode of the fourteenth transistor is electrically connected to the second output node;

a first electrode plate of the fifth capacitor is electrically connected to the gate electrode of the thirteenth transistor, and a second electrode plate of the fifth capacitor is electrically connected to the sixth node;

a gate electrode of the fifteenth transistor is electrically connected to the first output node, a first electrode of the fifteenth transistor is electrically connected to the second output node, and a second electrode of the fifteenth transistor is electrically connected to the second voltage line.

Optionally, the first output node control circuit includes a sixteenth transistor;

a gate electrode of the sixteenth transistor is electrically connected to the control signal line, a first electrode of the sixteenth transistor is electrically connected to the second voltage line, and a second electrode of the sixteenth transistor is electrically connected to the first output node.

The driving circuit according to at least one embodiment of the present disclosure further includes a seventeenth transistor;

The first node is electrically connected to the gate electrode of the thirteenth transistor through the seventeenth transistor;

a gate electrode of the seventeenth transistor is electrically connected to the third voltage line, a first electrode of the seventeenth transistor is electrically connected to the first node, and a second electrode of the seventeenth transistor is electrically connected to the gate electrode of thirteenth transistor.

In specific implementation, when the seventeenth transistor is a p-type transistor, the third voltage line may be a low voltage line.

Optionally, the output circuit includes an output transistor, and the output reset circuit includes an output reset transistor;

a gate electrode of the output transistor is electrically connected to the second output node, a first electrode of the output transistor is electrically connected to the second voltage line, and a second electrode of the output transistor is electrically connected to the driving signal output terminal;

a gate electrode of the output reset transistor is electrically connected to the first output node, a first electrode of the output reset transistor is electrically connected to the driving signal output terminal, and a second electrode of the output reset transistor is electrically connected to the first voltage line.

Figure 8:
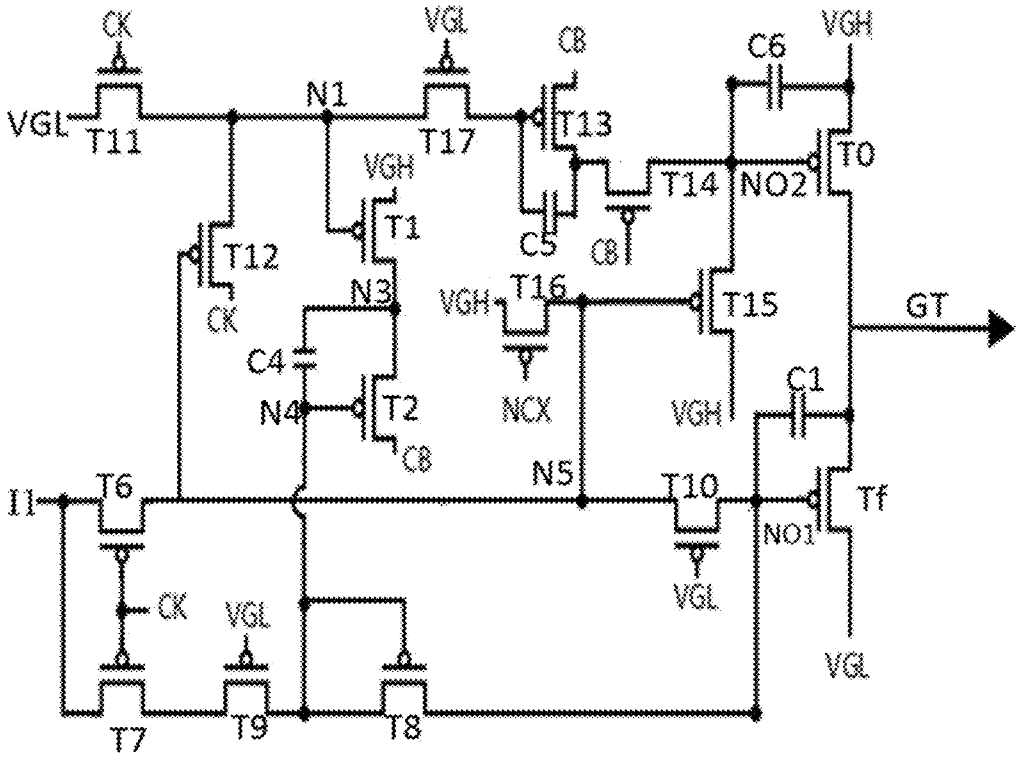
FIG. 8 is a circuit diagram of a driving circuit according to at least one embodiment of the present disclosure.

As shown in FIG. 8, based on at least one embodiment of the driving circuit shown in FIG. 7, The first energy storage circuit includes a first capacitor C1; the second energy storage circuit includes a sixth capacitor C6;

The first electrode plate of the first capacitor C1 is electrically connected to the first output node NO1, and the second electrode plate of the first capacitor C1 is electrically connected to the driving signal output terminal GT;

The first terminal of the sixth capacitor C6 is electrically connected to the second output node NO2, and the second terminal of the sixth capacitor C6 is electrically connected to the high voltage line VGH;

The first output node control circuit includes a first transistor T1, a second transistor T2, a fourth capacitor C4, a sixth transistor T6, a seventh transistor T7, an eighth transistor T8, a ninth transistor T9 and a tenth transistor T10;

The gate electrode of the first transistor T1 is electrically connected to the first node N1, the drain electrode of the first transistor T1 is electrically connected to the high voltage line VGH, and the source electrode of the first transistor T1 is electrically connected to the third node N3;

The gate electrode of the second transistor T2 is electrically connected to the fourth node N4, the drain electrode of the second transistor T2 is electrically connected to the third node N3, and the source electrode of the second transistor T2 is electrically connected to the first clock signal line CB;

The first electrode plate of the fourth capacitor C4 is electrically connected to the third node N3, and the second electrode plate of the fourth capacitor C4 is electrically connected to the fourth node N4;

The gate electrode of the sixth transistor T6 is electrically connected to the second clock signal line CK, the drain electrode of the sixth transistor T6 is electrically connected to the input terminal I1, and the source electrode of the sixth transistor T6 is electrically connected to the fifth node N5;

The gate electrode of the tenth transistor T10 is electrically connected to the low voltage line VOL, the drain electrode of the tenth transistor T10 is electrically connected to the fifth node N5, and the source electrode of the tenth transistor T10 is electrically connected to the first output node NO1;

The gate electrode of the seventh transistor 17 is electrically connected to the second clock signal line CK, the drain electrode of the seventh transistor T7 is electrically connected to the input terminal I1, and the source electrode of the seventh transistor T7 is electrically connected to the drain electrode of the ninth transistor T9;

The gate electrode of the ninth transistor T9 is electrically connected to the low voltage line VGL, and the source electrode of the ninth transistor T9 is electrically connected to the fourth node N4;

The gate electrode of the eighth transistor T8 and the drain electrode of the eighth transistor T8 are electrically connected to the fourth node N4, and the source electrode of the eighth transistor T8 is electrically connected to the first output node NO1;

The first node control circuit includes an eleventh transistor T11 and a twelfth transistor T12;

The gate electrode of the eleventh transistor T11 is electrically connected to the second clock signal line CK, and the drain electrode of the eleventh transistor T11 is electrically connected to the low voltage line VGL, the source electrode of the eleventh transistor T11 is electrically connected to the first node N1;

The gate electrode of the twelfth transistor T12 is electrically connected to the fifth node N5, the drain electrode of the twelfth transistor T12 is electrically connected to the second clock signal line CK, and the source electrode of the twelfth transistor T12 is electrically connected to the first node N1;

The second output node control circuit includes a seventeenth transistor T17, a thirteenth transistor T13, a fourteenth transistor T14, a fifth capacitor C5 and a fifteenth transistor T15;

The gate electrode of the seventeenth transistor T17 is electrically connected to the low voltage line VGL, the drain electrode of the seventeenth transistor T17 is electrically connected to the first node N1, and the source electrode of the seventeenth transistor T17 is electrically connected to the gate electrode of the thirteenth transistor T13;

The drain electrode of the thirteenth transistor T13 is electrically connected to the first clock signal line CB, and the source electrode of the thirteenth transistor T13 is electrically connected to the sixth node N6;

The gate electrode of the fourteenth transistor T14 is electrically connected to the first clock signal line CB, the drain electrode of the fourteenth transistor T14 is electrically connected to the sixth node N6, and the source electrode of the fourteenth transistor T14 is electrically connected to the second output node NO2;

The first electrode plate of the fifth capacitor C5 is electrically connected to the gate electrode of the thirteenth transistor T13, and the second electrode plate of the fifth capacitor C5 is electrically connected to the sixth node N6;

The gate electrode of the fifteenth transistor T15 is electrically connected to the fifth node N5, the drain electrode of the fifteenth transistor T15 is electrically connected to the second output node NO2, and the source electrode of the fifteenth transistor T15 is electrically connected to the high voltage line VGH;

The first output node control circuit includes a sixteenth transistor T16;

The gate electrode of the sixteenth transistor T16 is electrically connected to the control signal line NCX, the drain electrode of the sixteenth transistor T16 is electrically connected to the high voltage line VGH, and the source electrode of the sixteenth transistor T16 is electrically connected to the fifth node N5;

The output circuit includes an output transistor T0, and the output reset circuit includes an output reset transistor Tf;

The gate electrode of the output transistor T0 is electrically connected to the second output node NO2, the drain electrode of the output transistor T0 is electrically connected to the high voltage line VGH, and the source electrode of the output transistor T0 is connected to the driving signal output terminal GT;

The gate electrode of the output reset transistor Tf is electrically connected to the first output node NO1, the drain electrode of the output reset transistor Tf is electrically connected to the driving signal output terminal GT, and the source electrode of the output reset transistor Tf is electrically connected to the low voltage line VGL In at least one embodiment of the driving circuit shown in FIG. 8, all transistors are p-type transistors, but are not limited to this.

In at least one embodiment of the driving circuit shown in FIG. 8 of the present disclosure, a first capacitor C1 is added between the gate electrode of Tf and the drain electrode of Tf to enhance the pull-down capability of Tf, thereby thoroughly pulling down the potential of the driving signal provided by the driving signal output terminal GT, and the transistor whose gate electrode is connected to the driving signal in the pixel circuit is turned off faster, the negative impact caused by two pull-downs between high level and low level on the potential of the driving signal is reduced.

In the related art, low-temperature polysilicon and oxide hybrid driving has been widely used in high-end organic light-emitting diode (OLED) display panels. At least one embodiment of the driving circuit shown in FIG. 8 of the present disclosure is configured to driving oxide TFTs in the display area, this driving circuit has a stronger pull-down ability for the potential of the driving signal, which can effectively reduce the step height during the switching process of the potential of the driving signal from high level to low level, so that the high and low switching of the potential of the driving signal is smoother, thereby achieving the purpose of improving the screen display effect of the display panel.

In at least one embodiment of the driving circuit shown in FIG. 8 of the present disclosure, T10, T9 and T17 are transistors that are always turned on.

When at least one embodiment of the driving circuit shown in FIG. 8 of the present disclosure is working, after the potential of the input signal provided by the input terminal I1 changes from high voltage to low voltage, the potential of the second clock signal provided by CK changes from high to low, and the low voltage signal provided by I1 is written into N5, N4 and NO2. Since the low voltage value of the second clock signal is −7V after passing through T6, due to the loss of threshold voltage, the potential of N5 is −4.5. After passing through T7 and T9, due to the loss of threshold voltage, the potential of N4 is −2.5V. At this time, T15 is turned on, NO2 and VGH are connected, and TO is turned off. Due to the transistor T10 is always turned on, T8 is a transistor with a diode connection structure. With the potential of NO1 gradually becomes negative, and the low voltage signal provided by VGL is output through Tf. Since Tf is a buffer transistor, the width-to-length of the channel of Tf is relatively large Through the bootstrap effect, the potential of NO1 will be gradually pulled down By increasing the voltage between the gate electrode of Tf and the drain electrode of Tf enhances the bootstrap effect, so that the potential of NO1 reaches a lower potential at this stage.

Figure 9:
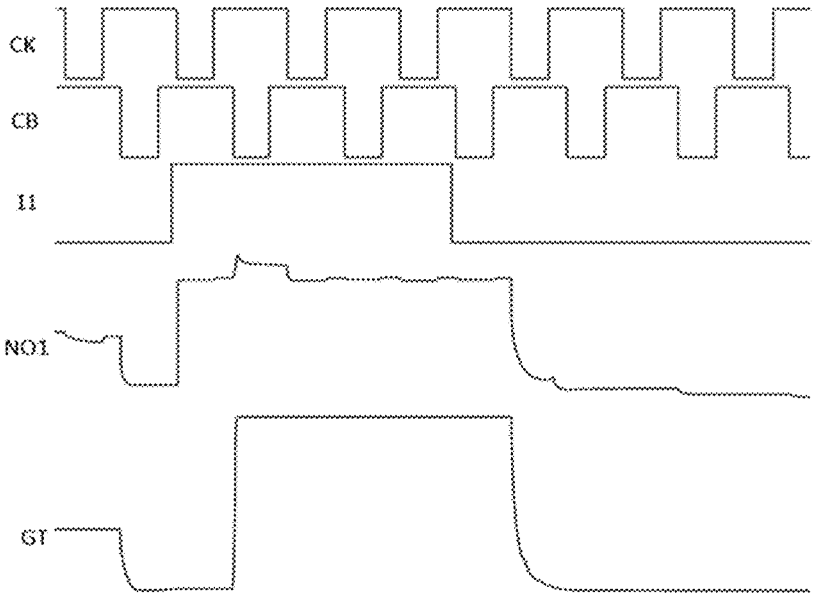
FIG. 9 is a simulation working timing diagram of the driving circuit shown in FIG. 8.

FIG. 9 is a simulation timing diagram of the driving circuit shown in FIG. 8.

As shown in FIG. 9, when at least one embodiment of the driving circuit shown in FIG. 8 is working, the falling edge of the driving signal output by the GT has no steps.

During specific implementation, when at least one embodiment of the driving circuit shown in FIG. 8 is working, a simulation scan was performed on the capacitance value of C1 from 0 fF to 100 fF, with a gradient of 10 fF. It can be seen that as the capacitance value of C1 continues to increase, the pulling-down step of the potential of NO1 will gradually decrease after the potential of the input signal jumps from high voltage to low voltage. After the capacitance value of C4 increases to a certain value, the position of the pull-down step of the potential of NO1 will become closer and closer to output voltage of −7V. However, for the actual layout, increasing the capacitance value of C1 will increase the larger layout area, which affects the overall width of the driving circuit, and further affects the size of the display panel frame, so it is reasonable that the capacitance value of C1 is set between 5 fF and 50 fF.

In at least one embodiment of the present disclosure, the first capacitor includes a first electrode plate and a second electrode plate;

The first electrode plate includes a first electrode plate part and a second electrode plate part that are electrically connected to each other;

The first electrode plate part is formed on the first metal layer, the second electrode plate part is formed on the second metal layer, the second electrode plate part is formed on the third metal layer, and the second metal layer is arranged between the first metal layer and the third metal layer;

The sixth capacitor includes a first electrode plate and a second electrode plate;

The first electrode plate of the sixth capacitor is formed on the first metal layer, and the second electrode plate of the sixth capacitor is formed on the fifth metal layer.

Optionally, the first metal layer is a first gate metal layer, the second metal layer is a first source-drain metal layer, the third metal layer is a second source-drain metal layer, and the fifth metal layer may be a second gate metal layer.

Figure 10A:
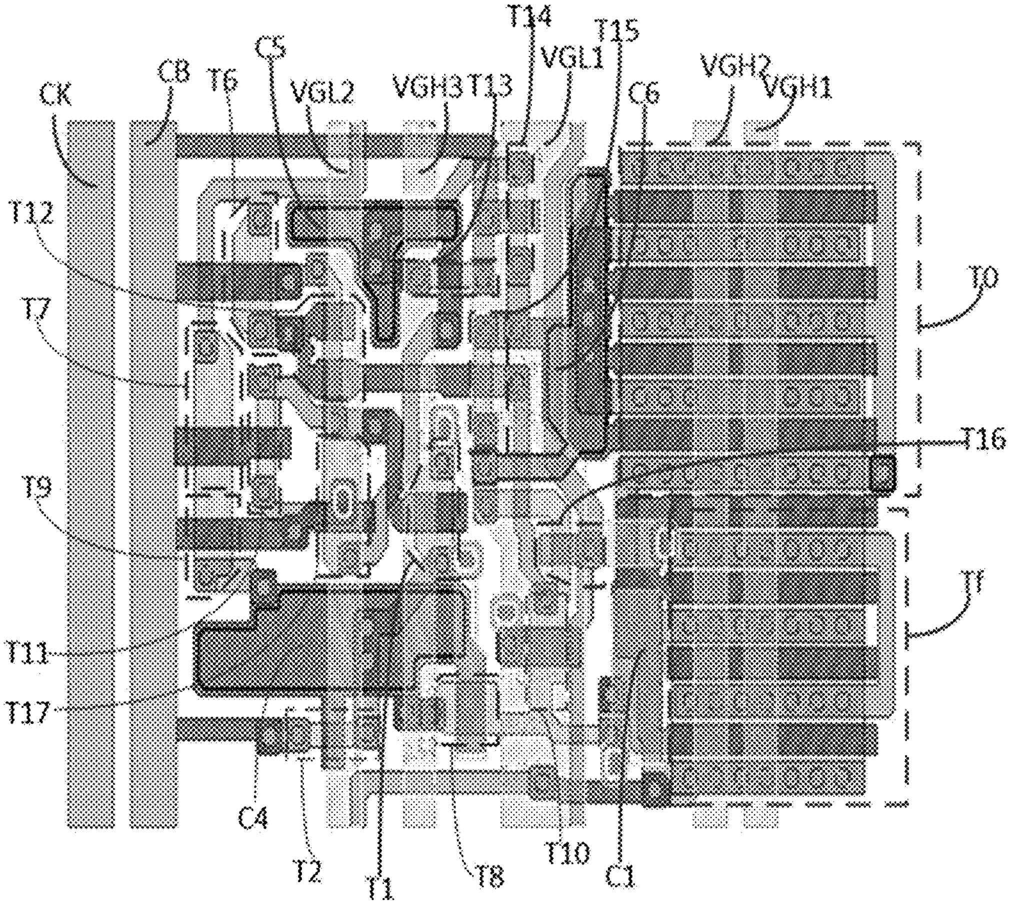
FIG. 10A is a first layout diagram of the driving circuit shown in FIG. 8.

FIG. 10A is a first layout diagram of the driving circuit shown in FIG. 8.

In FIG. 10A, the line labeled VGH1 is the first high voltage line, the line labeled VH2 is the second high voltage line, the line labeled VGH3 is the third high voltage line, and the line labeled VGL1 is the first low voltage line, the line labeled VGL2 is the second low voltage line.

Figure 10B:
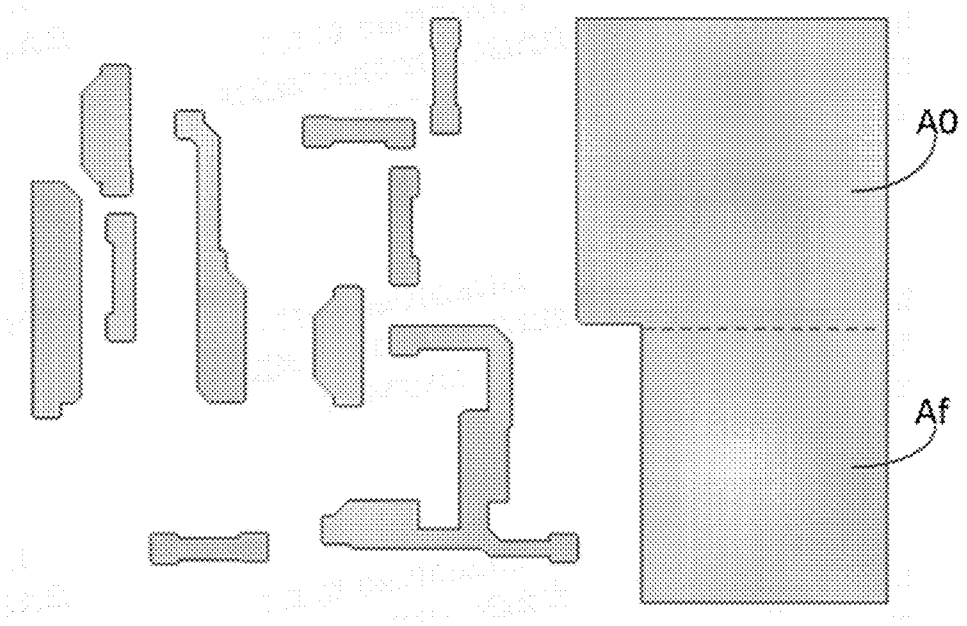
FIG. 10B is a layout diagram of the semiconductor layer in FIG. 10A.

FIG. 10B is a layout diagram of the semiconductor layer in FIG. 10A. In FIG. 10B, the one labeled A0 is the active pattern of T0, and the one labeled Af is the active pattern of Tf.

Figure 10C:
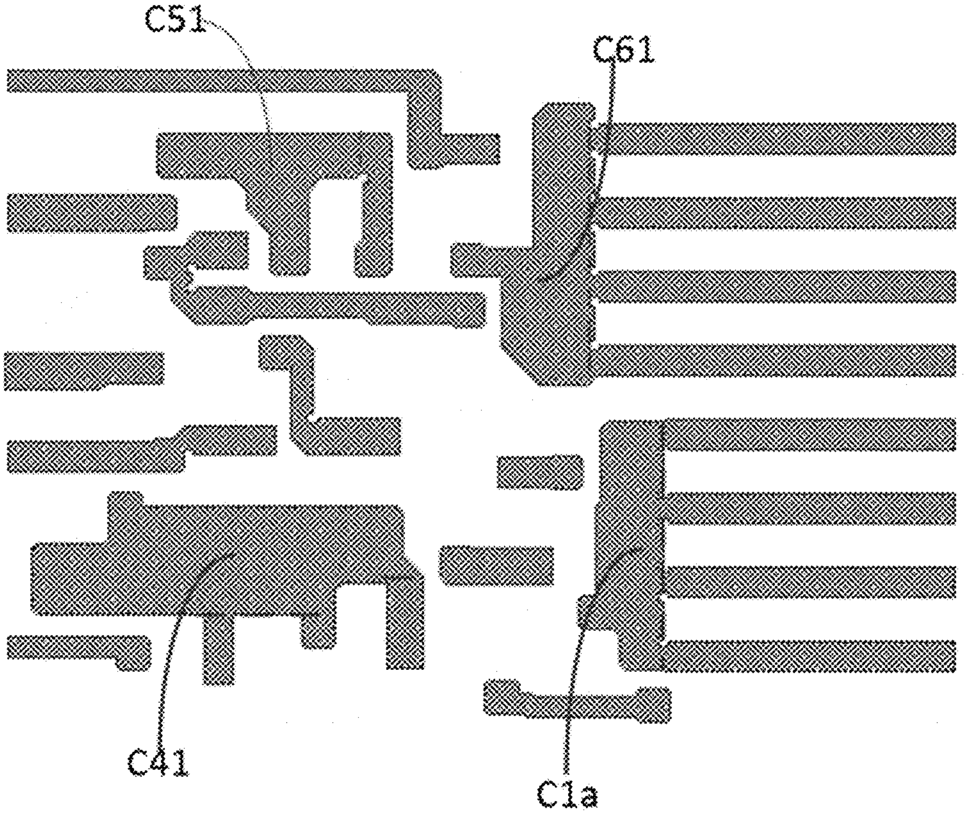
FIG. 10C is a layout diagram of the first gate metal layer in FIG. 10A.

FIG. 10C is a layout diagram of the first gate metal layer in FIG. 10A. In FIG. 10C, the one labeled C1*a* is the first electrode plate part of C1, the one labeled C41 is the first electrode plate part of C4, and the one labeled C51 is the first electrode plate of C5, and the one labeled C61 is the first electrode plate of C6.

Figure 10D:
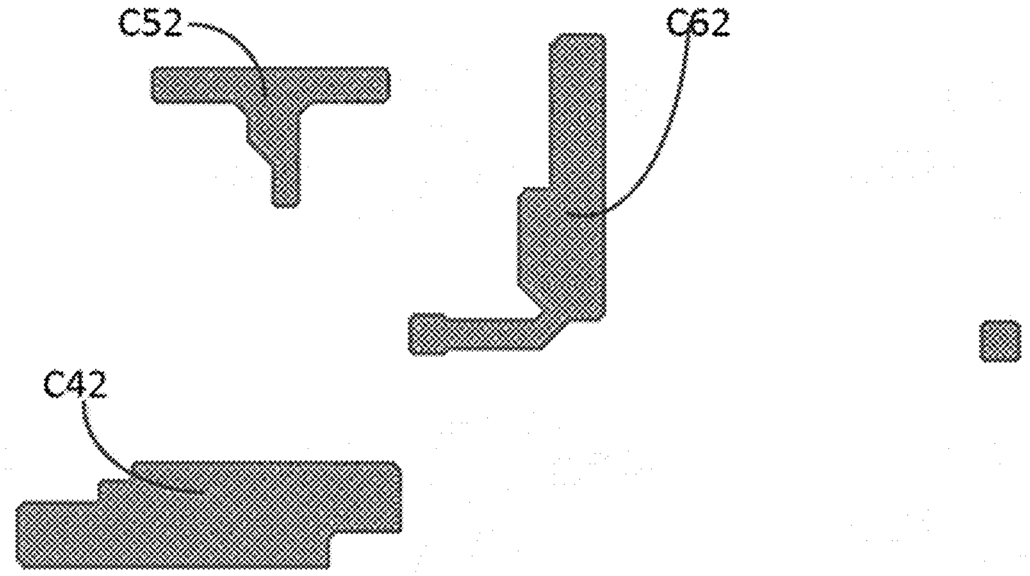
FIG. 10D is a layout diagram of the second gate metal layer in FIG. 10A.

FIG. 10D is a layout diagram of the second gate metal layer in FIG. 10A. In FIG. 10D, the one labeled C42 is the second electrode plate of C4, the one labeled C52 is the second electrode plate of C5, and the one labeled C62 is the second electrode plate of C6.

Figure 10E:
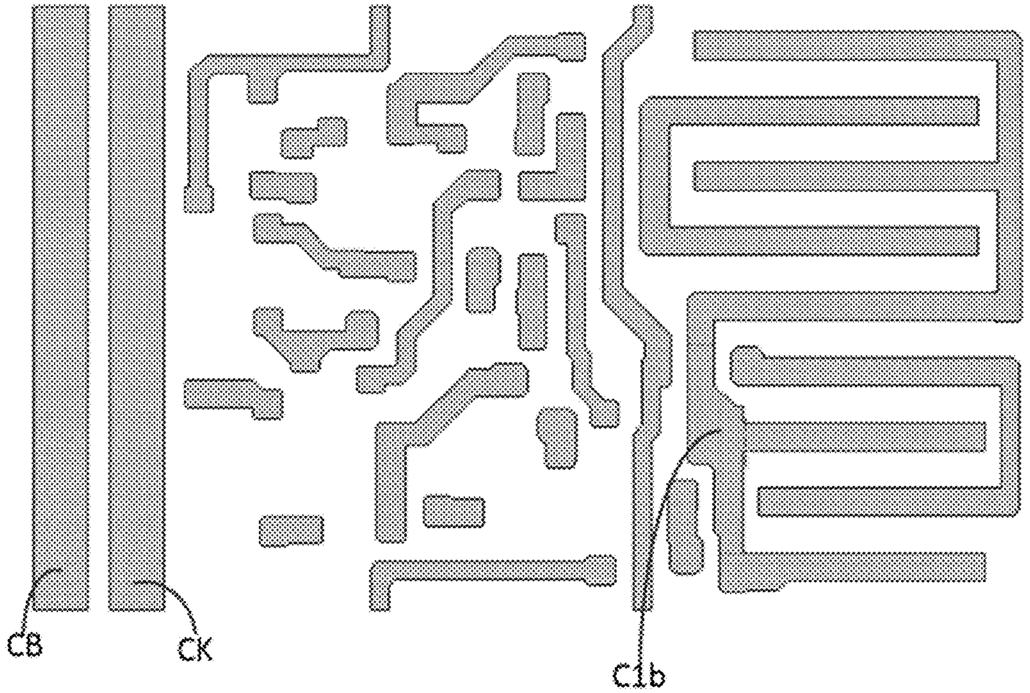
FIG. 10E is a layout diagram of the first source-drain metal layer in FIG. 10A.

FIG. 10E is a layout diagram of the first source-drain metal layer in FIG. 10A. In FIG. 10E, the one labeled C1*b* is the second electrode plate of C1.

Figure 10F:
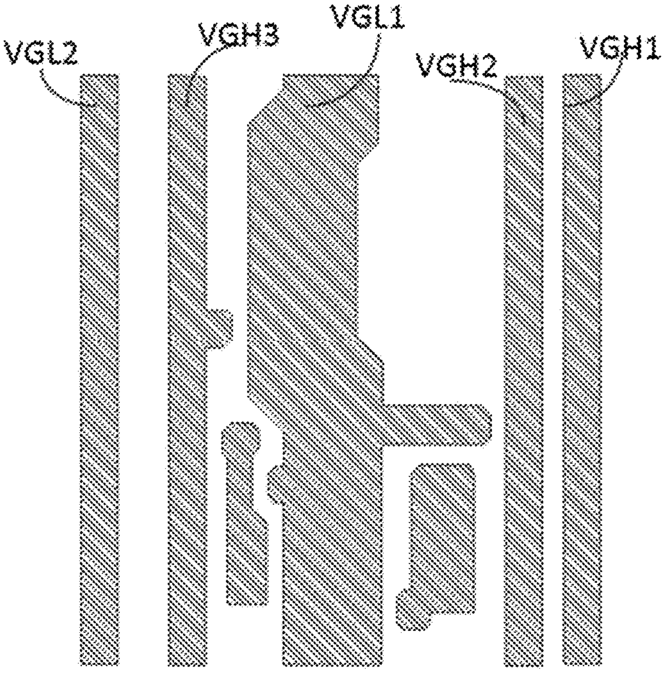
FIG. 10F is a layout diagram of the second source-drain metal layer in FIG. 10A.

FIG. 10F is a layout diagram of the second source-drain metal layer in FIG. 10A.

As shown in FIG. 10A, in order not to occupy more layout space and to ensure the stability of the capacitance value of C1, a sandwich structure of the first gate metal layer, the first source-drain metal layer and the second source-drain metal layer is used. The first capacitor includes a first electrode plate and a second electrode plate. The first electrode plate includes a first electrode plate part and a second electrode plate part that are electrically connected to each other. The first electrode plate part is formed on the first gate metal layer, the second electrode plate are formed on the first source-drain metal layer, and the second electrode plate part is formed on the second source-drain metal layer. A stable capacitance value is formed through the sandwich design.

Figure 11:
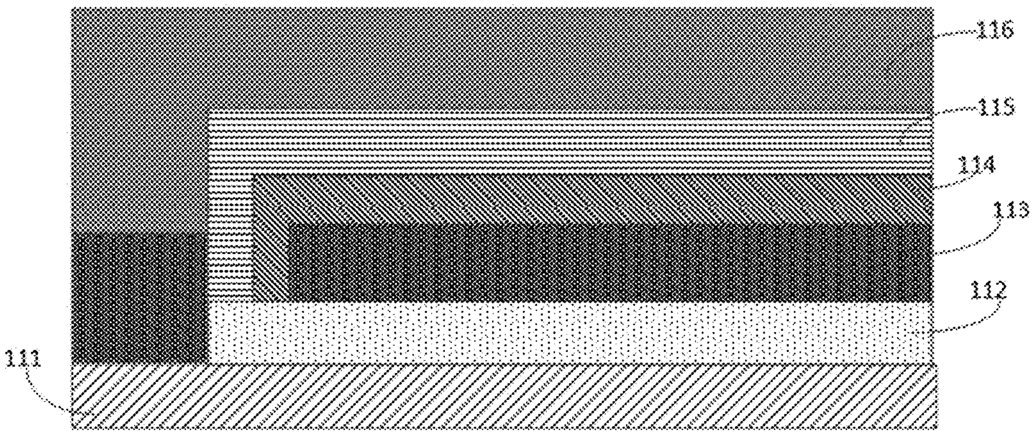
FIG. 11 is a schematic diagram of the stack of the first capacitor in FIG. 10A.

As shown in FIG. 11, the one labeled 111 is the first gate metal layer, the one labeled 112 is the interlayer dielectric layer, the one labeled 113 is the first source-drain metal layer, the one labeled 114 is the passivation layer, and the one labeled 115 is the planarization layer, and the one labeled 116 is the second source-drain metal layer;

A driving signal output terminal is formed on the first source-drain metal layer 113, and the driving signal output terminal is electrically connected to the second electrode plate;

the first electrode plate part of C1 and the gate electrode of Tf are formed on the first gate metal layer 111, and the first electrode plate part of C1, the gate electrode of the Tf, and the second electrode plate part of C1 are electrically connected to each other.

In at least one embodiment of the present disclosure, the first capacitor includes a first electrode plate and a second electrode plate; the sixth capacitor includes a first electrode plate and a second electrode plate;

The first electrode plate of the first capacitor is formed on the fourth metal layer, and the second electrode plate of the first capacitor is formed on the fifth metal layer;

The first electrode plate of the sixth capacitor is formed on the fourth metal layer, and the second electrode plate of the sixth capacitor is formed on the fifth metal layer.

Optionally, the fourth metal layer is a first gate metal layer, and the fifth metal layer is a second gate metal layer.

Figure 12A:
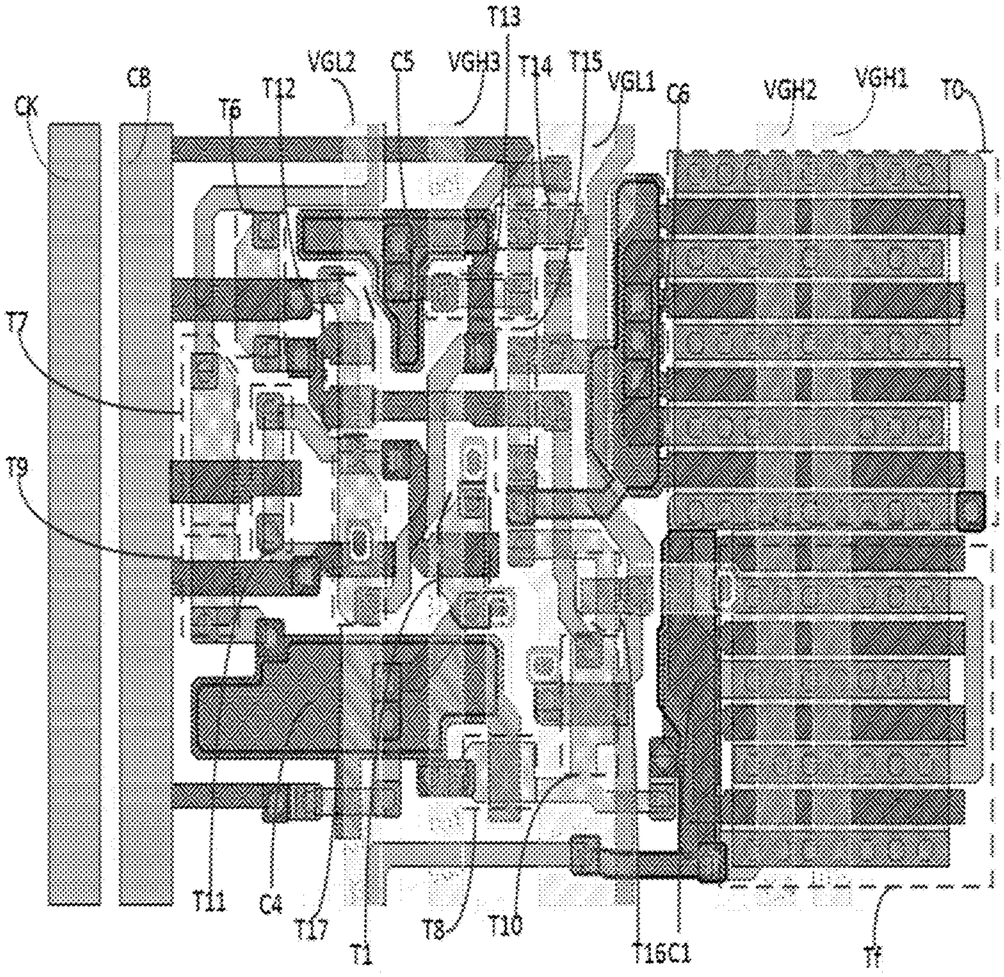
FIG. 12A is a second layout diagram of the driving circuit shown in FIG. 8.

FIG. 12A is a second layout diagram of the driving circuit shown in FIG. 8.

In FIG. 12A, the line labeled VGH1 is the first high voltage line, the line labeled VH42 is the second high voltage line, the line labeled VGH3 is the third high voltage line, and the line labeled VGL1 is the first low voltage line, the line labeled VGL2 is the second low voltage line.

Figure 12B:
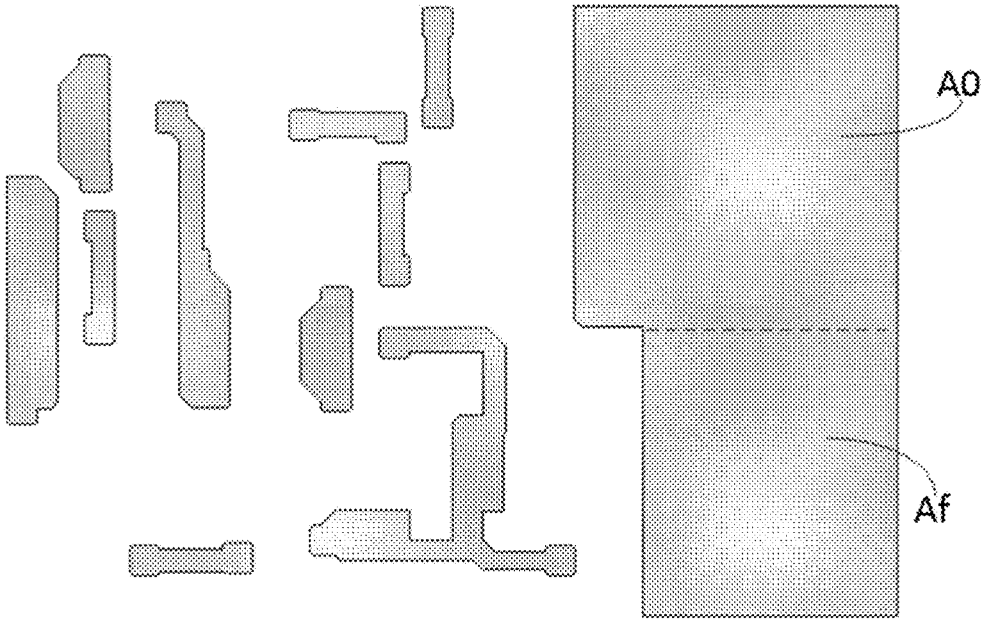
FIG. 12B is a layout diagram of the semiconductor layer in FIG. 12A.

FIG. 12B is a layout diagram of the semiconductor layer in FIG. 12A. In FIG. 12B, the one labeled AC is the active pattern of TO, and the one labeled Af is the active pattern of Tf.

Figure 12C:
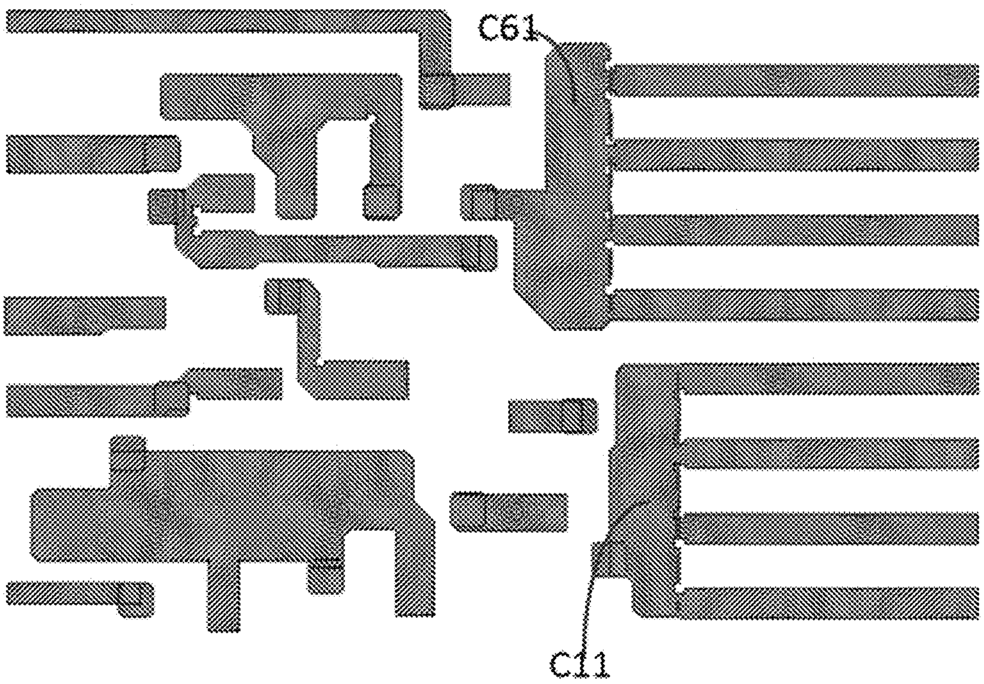
FIG. 12C is a layout diagram of the first gate metal layer in FIG. 12A.

FIG. 12C is a layout diagram of the first gate metal layer in FIG. 12A. In FIG. 12C, the one labeled CII is the first electrode plate of C1, and the one labeled C61 is the first electrode plate of C6.

Figure 12D:
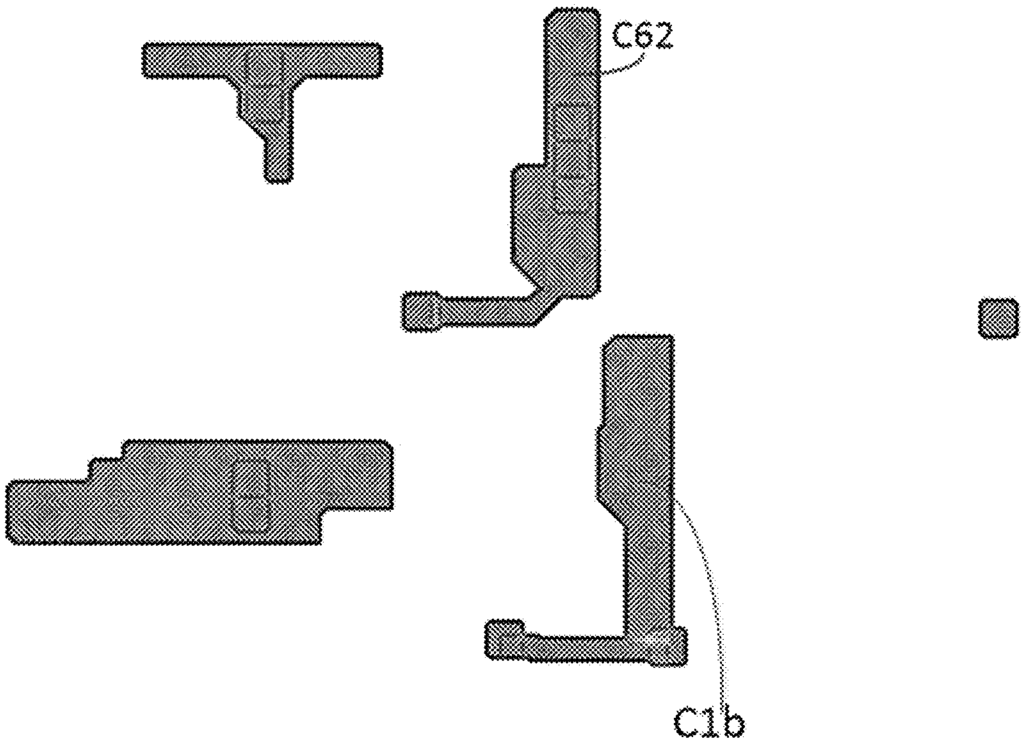
FIG. 12D is a layout diagram of the second gate metal layer in FIG. 12A.

FIG. 12D is a layout diagram of the second gate metal layer in FIG. 12A. In FIG. 12D, the one labeled C1*b* is the second electrode plate of C1, and the one labeled C62 is the second electrode plate of C6.

Figure 12E:
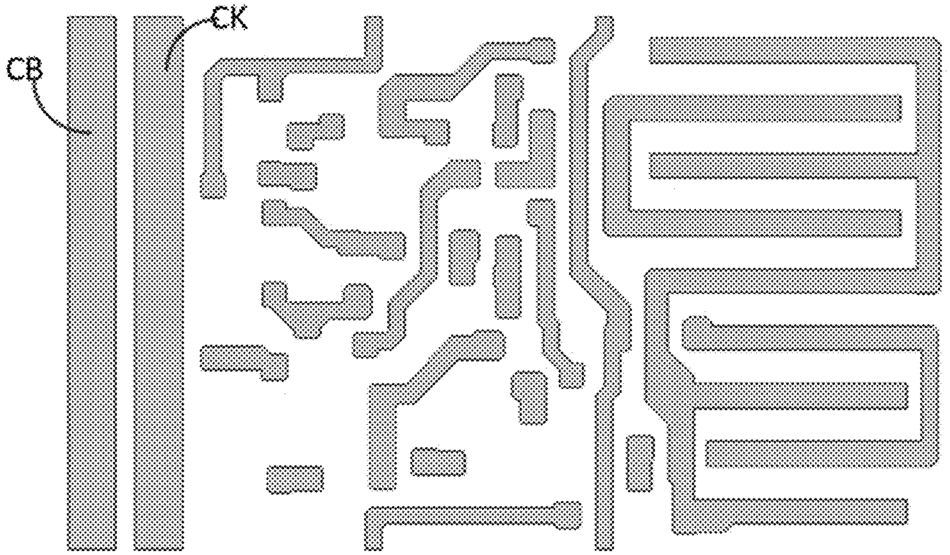
FIG. 12E is a layout diagram of the first source-drain metal layer in FIG. 12A.

FIG. 12E is a layout diagram of the first source-drain metal layer in FIG. 12A.

Figure 12F:
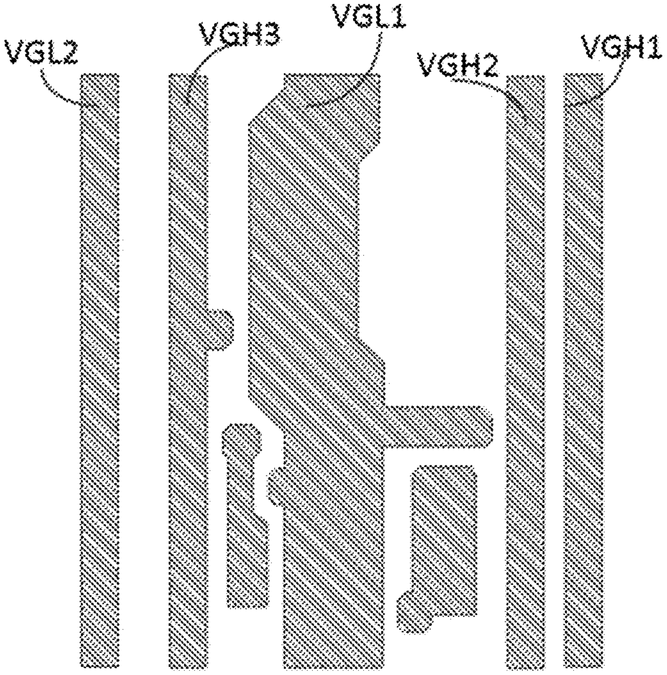
FIG. 12F is a layout diagram of the second source-drain metal layer in FIG. 12A.

FIG. 12F is a layout diagram of the second source-drain metal layer in FIG. 12A.

Figure 13:
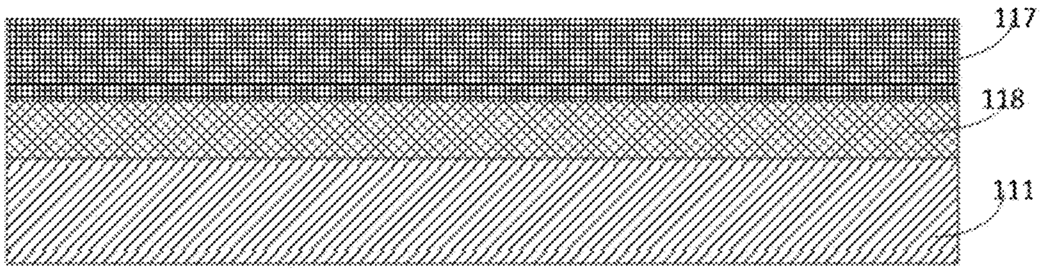
FIG. 13 is a schematic diagram of the stack of the first capacitor in FIG. 12A.

As shown in FIG. 13, the one labeled 111 is the first gate metal layer, the one labeled 117 is the second gate metal layer, and the one labeled 118 is the gate insulating layer; the gate insulating layer 118 is arranged between the first gate metal layer III and the second gate metal layer 117;

The first electrode plate of the first capacitor is formed on the first gate metal layer 111, and the second electrode plate of the first capacitor is formed on the second gate metal layer 117;

The gate electrode of Tf is formed on the first gate metal layer 111, and the gate electrode of Tf is electrically connected to the first electrode plate of the first capacitor;

The driving signal output terminal is formed on the second gate metal layer 117 and is electrically connected to the second electrode plate of the first capacitor.

In at least one embodiment of the present disclosure, the first gate metal layer and the second gate metal layer can be configured to form the first capacitor. Since the dielectric constant of the first gate metal layer and the dielectric constant of the second gate metal layer are relatively large, a smaller overlapping area can form a larger capacitance value.

In specific implementation, the film layer forming the electrode plate of the first capacitor can be any metal film layer, and can be designed according to the dielectric constant between different metal film layers.

At least one embodiment of the present disclosure can be applied not only to 16 T driving circuits, but also to 13 T driving circuits, 12 T driving circuits, etc. by arranging a first capacitor between the gate electrode of Tf and the drain electrode of Tf to buffer the bootstrap effect of the transistor. Shift registers that output low-voltage signals and high-voltage signals can reduce the falling step of Tf in the output reset stage.

Figure 14:
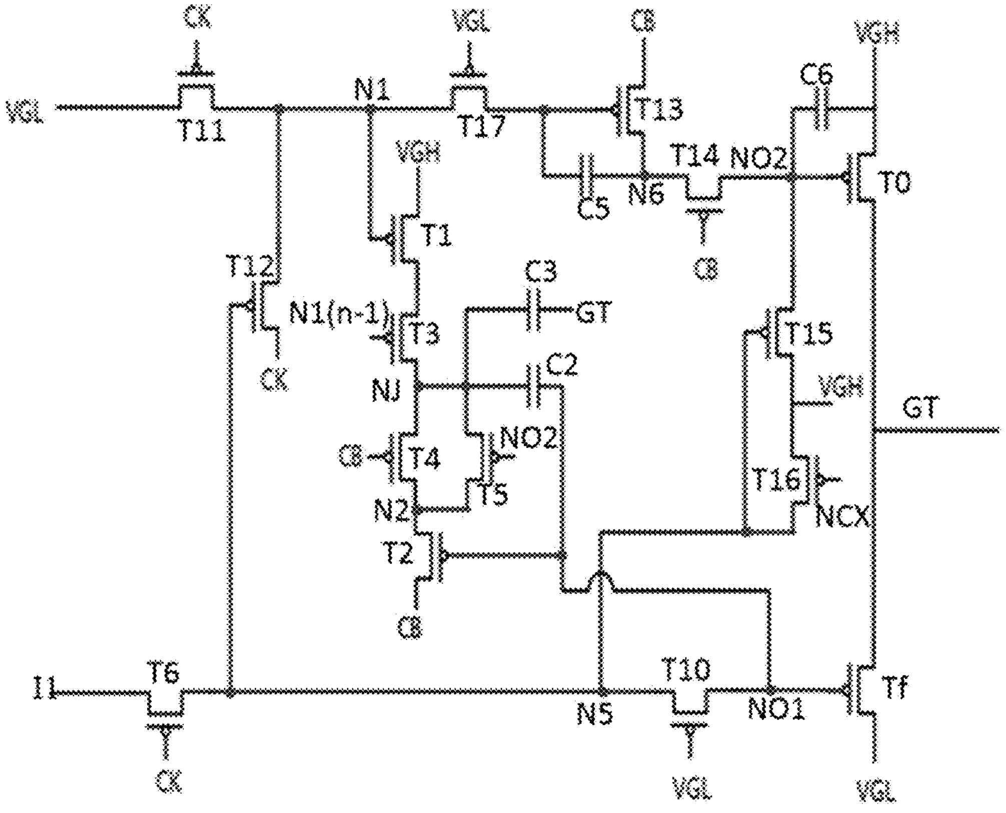
FIG. 14 is a circuit diagram of a driving circuit according to at least one embodiment of the present disclosure.

As shown in FIG. 14, based on at least one embodiment of the driving circuit shown in FIG. 5, The first energy storage circuit includes a second capacitor C2 and a third capacitor C3; the second energy storage circuit includes a sixth capacitor C6;

The first electrode plate of the second capacitor C2 is electrically connected to the first output node NO1, and the second electrode plate of the second capacitor C2 is electrically connected to the connection node NJ;

The first electrode plate of the third capacitor C3 is electrically connected to the connection node NJ, and the second electrode plate of the third capacitor C3 is electrically connected to the driving signal output terminal GT;

The first terminal of the sixth capacitor C6 is electrically connected to the second output node NO2, and the second terminal of the sixth capacitor C6 is electrically connected to the high voltage line VGH;

The connection node control circuit includes a first transistor T1, a second transistor T2, a third transistor T3, a fourth transistor T4 and a fifth transistor T5;

The gate electrode of the first transistor T1 is electrically connected to the first node N1, the drain electrode of the first transistor T1 is electrically connected to the high voltage line VGI, and the source electrode of the first transistor T1 is electrically connected to the drain electrode of the third transistor T3;

The gate electrode of the second transistor T2 is electrically connected to the first output node NOL, the drain electrode of the second transistor T2 is electrically connected to the second node N2, and the source electrode of the second transistor T2 is electrically connected to the first clock signal line CB;

The gate electrode of the third transistor T3 is electrically connected to the adjacent first node N1 (n−1) of the previous stage, and the source electrode of the third transistor T3 is electrically connected to the connection node NJ;

The gate electrode of the fourth transistor T4 is electrically connected to the first clock signal line CB, the drain electrode of the fourth transistor T4 is electrically connected to the connection node NJ, and the source electrode of the fourth transistor T4 is electrically connected to the second node N2;

The gate electrode of the fifth transistor T5 is electrically connected to the second output node NO2, the drain electrode of the fifth transistor T5 is electrically connected to the connection node NJ, and the source electrode of the fifth transistor T5 is electrically connected to the second node N2;

The first output node control circuit includes a sixth transistor T6 and a tenth transistor T10;

The gate electrode of the sixth transistor 16 is electrically connected to the second clock signal line CK, the drain electrode of the sixth transistor T6 is electrically connected to the input terminal I1, and the source electrode of the sixth transistor T6 is electrically connected to the fifth node N5;

The gate electrode of the tenth transistor T10 is electrically connected to the low voltage line VOL, the drain electrode of the tenth transistor T10 is electrically connected to the fifth node N5, and the source electrode of the tenth transistor T10 is electrically connected to the first output node NO1;

The first node control circuit includes an eleventh transistor T11 and a twelfth transistor T12;

The gate electrode of the eleventh transistor T11 is electrically connected to the second clock signal line CK, and the drain electrode of the eleventh transistor T11 is electrically connected to the low voltage line VGL, the source electrode of the eleventh transistor T11 is electrically connected to the first node N1;

The gate electrode of the twelfth transistor T12 is electrically connected to the fifth node N5, the drain electrode of the twelfth transistor T12 is electrically connected to the second clock signal line CK, and the source electrode of the twelfth transistor T12 is electrically connected to the first node N1;

The second output node control circuit includes a seventeenth transistor T17, a thirteenth transistor T13, a fourteenth transistor T14, a fifth capacitor C5 and a fifteenth transistor T15;

The gate electrode of the seventeenth transistor T17 is electrically connected to the low voltage line VGL, the drain electrode of the seventeenth transistor T17 is electrically connected to the first node N1, and the source electrode of the seventeenth transistor T17 is electrically connected to the gate electrode of the thirteenth transistor T13;

The drain electrode of the thirteenth transistor T13 is electrically connected to the first clock signal line CB, and the source electrode of the thirteenth transistor T13 is electrically connected to the sixth node N6;

The gate electrode of the fourteenth transistor T14 is electrically connected to the first clock signal line CB, the drain electrode of the fourteenth transistor T14 is electrically connected to the sixth node N6, and the source electrode of the fourteenth transistor T14 is electrically connected to the second output node NO2;

The first electrode plate of the fifth capacitor C5 is electrically connected to the gate electrode of the thirteenth transistor T13, and the second electrode plate of the fifth capacitor C5 is electrically connected to the sixth node N6;

The gate electrode of the fifteenth transistor T15 is electrically connected to the fifth node N5, the drain electrode of the fifteenth transistor T15 is electrically connected to the second output node NO2, and the source electrode of the fifteenth transistor T15 is electrically connected to the high voltage line VGH;

The first output node control circuit includes a sixteenth transistor T16;

The gate electrode of the sixteenth transistor T16 is electrically connected to the control signal line NCX, the drain electrode of the sixteenth transistor T16 is electrically connected to the high voltage line VGH, and the source electrode of the sixteenth transistor T16 is electrically connected to the fifth node N5;

The output circuit includes an output transistor T0, and the output reset circuit includes an output reset transistor Tf;

The gate electrode of the output transistor T0 is electrically connected to the second output node NO2, the drain electrode of the output transistor T0 is electrically connected to the high voltage line VGH, and the source electrode of the output transistor T0 is connected to the driving signal output terminal GT;

The gate electrode of the output reset transistor Tf is electrically connected to the first output node NO1, the drain electrode of the output reset transistor Tf is electrically connected to the driving signal output terminal GT, and the source electrode of the output reset transistor Tf is electrically connected to the low voltage line VGL.

At least one embodiment of the driving circuit shown in FIG. 14 of the present disclosure adds T3, T4, T5 and C3 during operation. The gate electrode of T3 is electrically connected to the first node in the adjacent previous stage of driving circuit. Using T1 and T3, during the period when the potential of the driving signal output by the driving circuit decreases, so that the high voltage signal provided by VGH is not written to the connection node NJ, T4 and T5 are connected in a parallel, and the gate electrode of T4 is connected to the first clock signal line CB, and the gate electrode of T5 is electrically connected to the second output node NO2. During the period when the potential of the driving signal decreases, the high voltage signal provided by CB cannot be written to the connection node NJ. Due to the function of T3, T4 and T5, during the tire period when the potential of the driving signal decreases, the connection node NJ is in a floating state. By increasing C3, the capacitance characteristics are configured to lower the potential of NJ during the time period when the potential of the driving signal decreases, thereby eliminating the falling edge steps of the driving signal.

Figure 15:
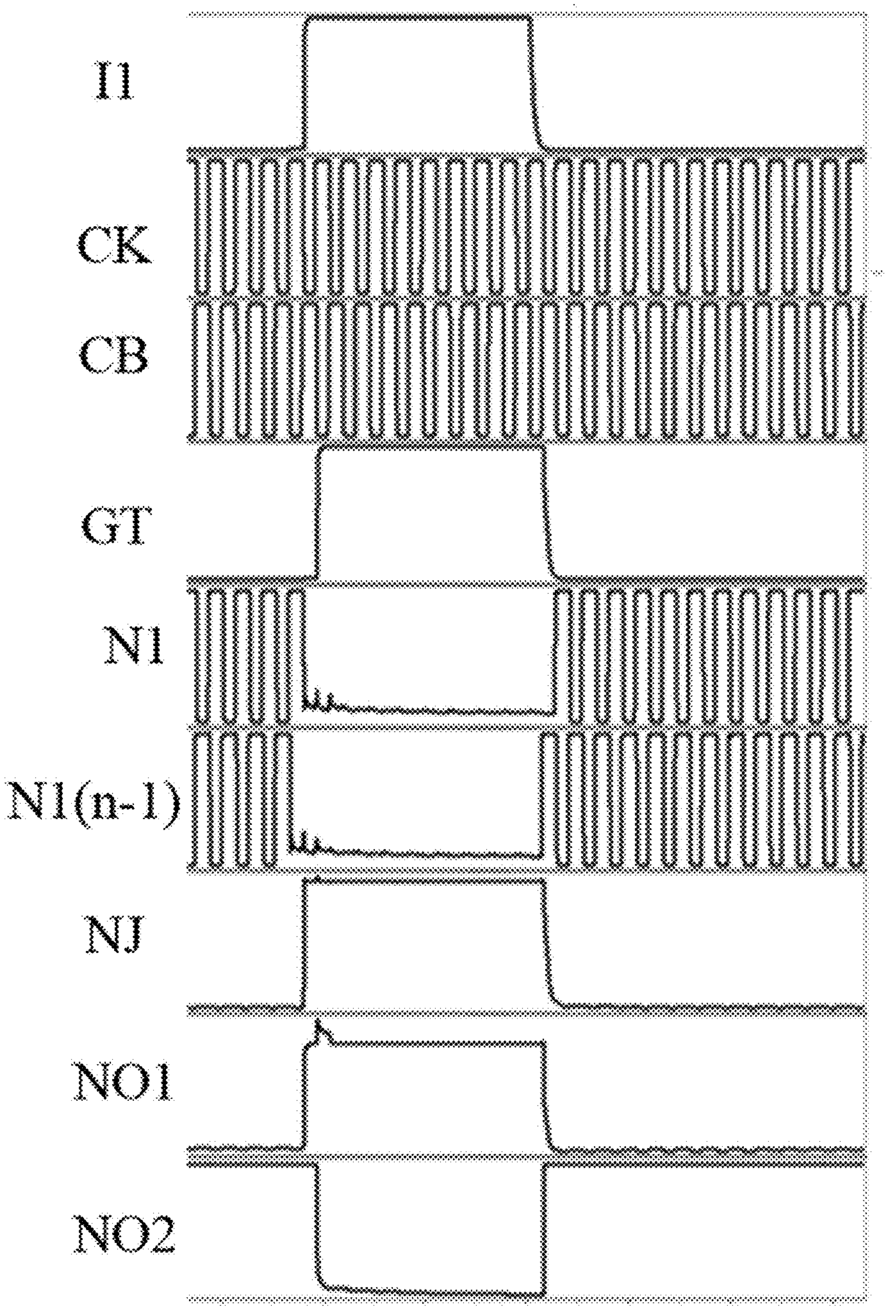
FIG. 15 is a working timing diagram of the driving circuit shown in FIG. 14 according to at least one embodiment of the present disclosure.

FIG. 15 is a working timing diagram of the driving circuit shown in FIG. 14 of at least one embodiment of the present disclosure. As shown in FIG. 14, the falling edge of the driving signal provided by the driving signal output terminal (GT has no steps.

Figure 16:
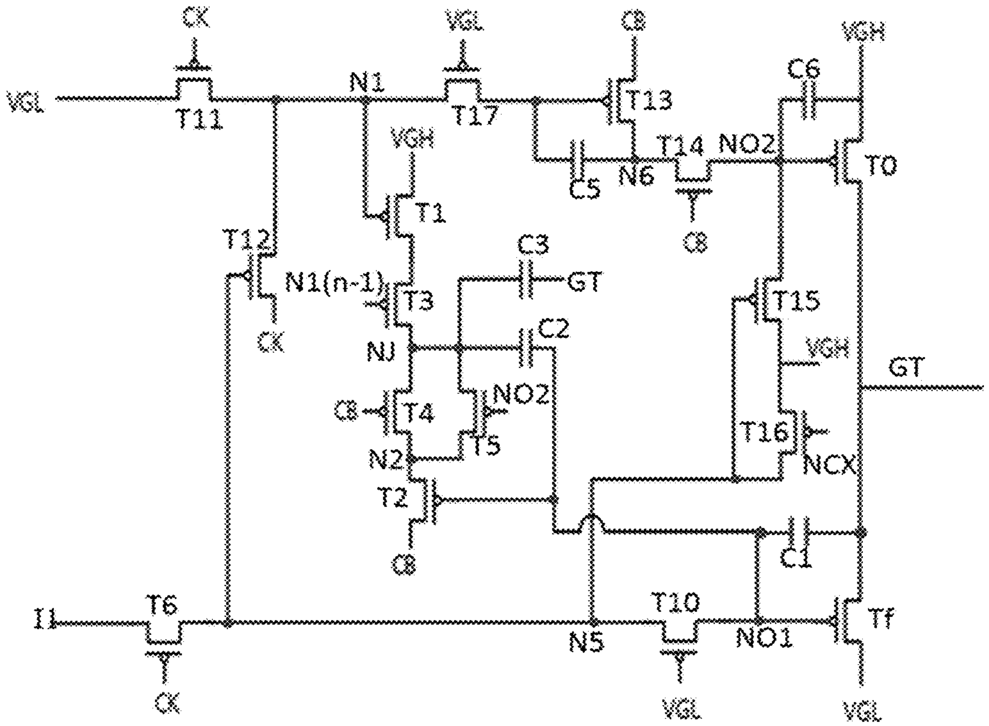
FIG. 16 is a circuit diagram of a driving circuit according to at least one embodiment of the present disclosure.

The difference between the driving circuit shown in FIG. 16 of at least one embodiment of the present disclosure and the driving circuit shown in FIG. 14 of at least one embodiment of the present disclosure is that it also includes a first capacitor C1;

The first electrode plate of the first capacitor C1 is electrically connected to the first output node NO1, and the second electrode plate of the first capacitor C1 is electrically connected to the driving signal output terminal GT.

At least one embodiment of the driving circuit shown in FIG. 16 of the present disclosure adds a first capacitor C1 to increase the pull-down capability of the potential of the first output node NO1 during the time period when the potential of the driving signal decreases, further reducing the falling time of the driving signal.

Figure 17:
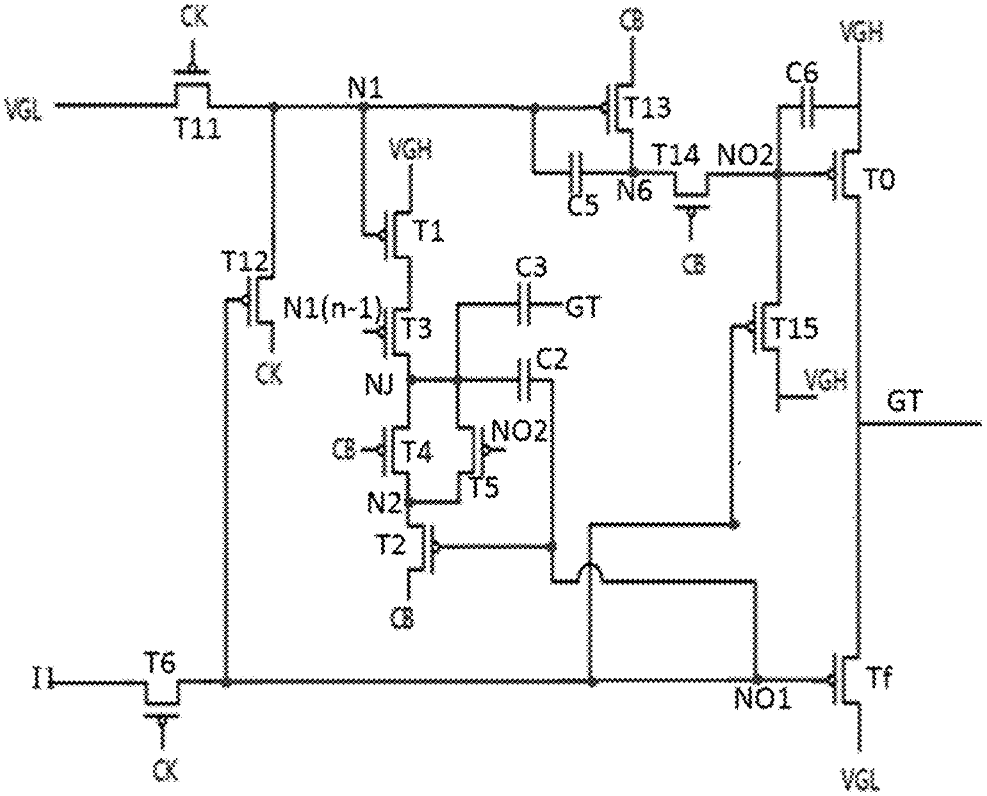
FIG. 17 is a circuit diagram of a driving circuit according to at least one embodiment of the present disclosure.

The difference between the driving circuit shown in FIG. 17 of at least one embodiment of the present disclosure and the driving circuit shown in FIG. 14 of at least one embodiment of the present disclosure is that;

The first output node control circuit includes a sixth transistor T6;

The gate electrode of the sixth transistor T6 is electrically connected to the second clock signal line CK, the drain electrode of the sixth transistor T6 is electrically connected to the input terminal I1, and the source electrode of the sixth transistor T6 is electrically connected to the first output node NO;

The second output node control circuit includes a thirteenth transistor T13, a fourteenth transistor T14, a fifth capacitor C5 and a fifteenth transistor T15;

The drain electrode of the thirteenth transistor T13 is electrically connected to the first clock signal line CB, and the source electrode of the thirteenth transistor T13 is electrically connected to the sixth node N6;

The gate electrode of the fourteenth transistor T14 is electrically connected to the first clock signal line CB, the drain electrode of the fourteenth transistor T14 is electrically connected to the sixth node N6, and the source electrode of the fourteenth transistor T14 is electrically connected to the second output node NO2, The first electrode plate of the fifth capacitor C5 is electrically connected to the gate electrode of the thirteenth transistor T13, and the second electrode plate of the fifth capacitor C5 is electrically connected to the sixth node N6;

The gate electrode of the fifteenth transistor T15 is electrically connected to the first output node NO1, and the drain electrode of the fifteenth transistor T15 is electrically connected to the second output node NO2, the source electrode of the fifteenth transistor T15 is electrically connected to the high voltage line VGH.

Figure 18:
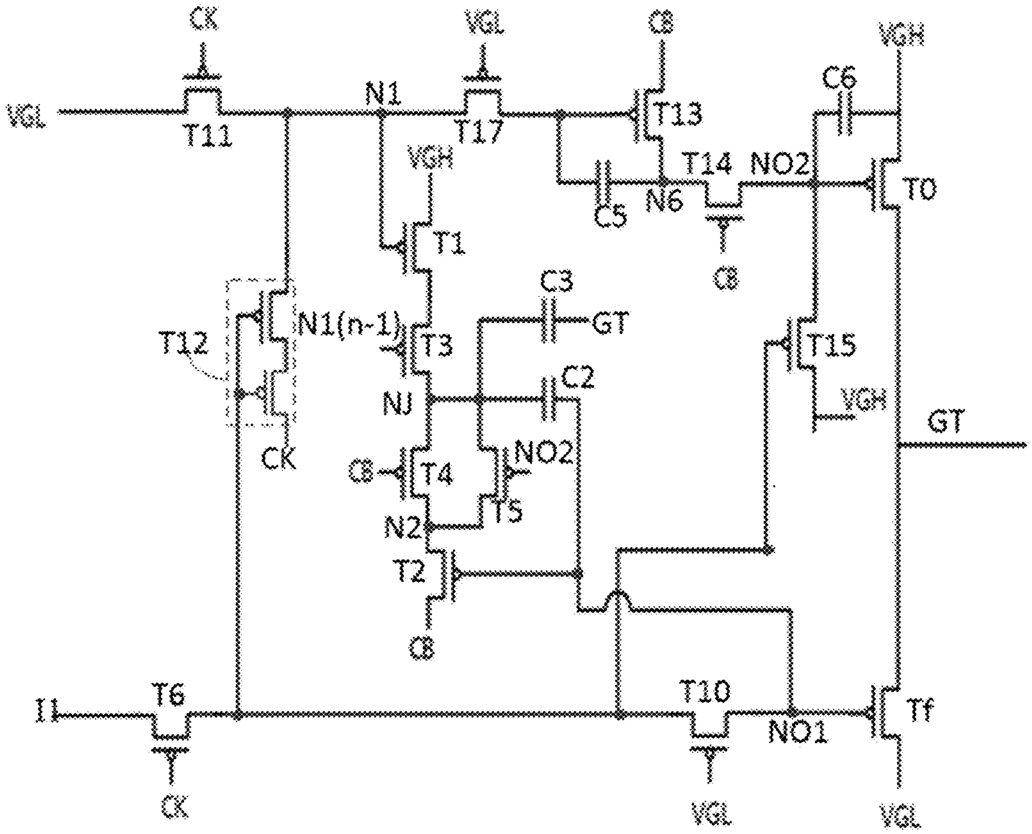
FIG. 18 is a circuit diagram of a driving circuit according to at least one embodiment of the present disclosure.

The difference between the driving circuit shown in FIG. 18 of at least one embodiment of the present disclosure and the driving circuit shown in FIG. 17 of at least one embodiment of the present disclosure is that;

The second output node control circuit also includes a seventeenth transistor T17;

The first node N1 is electrically connected to the gate electrode of the thirteenth transistor T13 through the seventeenth transistor T17;

The twelfth transistor T12 is a double-gate transistor;

The first output node control circuit includes a sixth transistor T6 and a tenth transistor T10;

The gate electrode of the sixth transistor T6 is electrically connected to the second clock signal line CK, the drain electrode of the sixth transistor T6 is electrically connected to the input terminal I1, and the source electrode of the sixth transistor T6 is electrically connected to the fifth node N5;

The gate electrode of the tenth transistor T10 is electrically connected to the low voltage line VOL, the drain electrode of the tenth transistor T10 is electrically connected to the fifth node N5, and the source electrode of the tenth transistor T10 is electrically connected to the first output node NO1.

The driving method described in the embodiment of the present disclosure is applied to the above-mentioned driving circuit, and the driving method includes:

Controlling, by the first output node control circuit, the potential of the first output node;

Controlling, by the second output node control circuit, the potential of the second output node;

Controlling, by the output reset circuit, to connect the driving signal output terminal and the first voltage line under the control of the potential of the first output node;

Controlling, by the output circuit, to connect the driving signal output terminal and the second voltage line tinder the control of the potential of the second output node;

Controlling, by the first energy storage circuit, the potential of the first output node according to the driving signal provided by the driving signal output terminal; maintaining, by the second energy storage circuit, the potential of the second output node.

The display device according to the embodiment of the present disclosure includes the above-mentioned driving circuit.

The above descriptions are implementations of the present disclosure. It should be pointed out that those skilled in the art can make some improvements and modifications without departing from the principle of the present disclosure. These improvements and modifications shall also fall within the scope of the present disclosure.

What is claimed is:

1. A driving circuit, comprising a first output node control circuit, an output reset circuit, a second output node control circuit, an output circuit, a first energy storage circuit, a second energy storage circuit, and a driving signal output terminal; wherein the first output node control circuit is electrically connected to a first output node and is configured to control a potential of the first output node;

the second output node control circuit is electrically connected to a second output node and is configured to control a potential of the second output node;

the output reset circuit is electrically connected to the first output node, the driving signal output terminal and a first voltage line respectively, and is configured to control to connect the driving signal output terminal and the first voltage line under control of the potential of the first output node;

the output circuit is electrically connected to the second output node, the driving signal output terminal and a second voltage line respectively, and is configured to control to connect the driving signal output terminal and the second voltage line under control of the potential of the second output node;

the first energy storage circuit is electrically connected to the first output node and the driving signal output terminal respectively, and the second energy storage circuit is electrically connected to the second output node and the second voltage line respectively, and the first energy storage circuit and the second energy storage circuit are configured to store electric energy;

wherein the first output node control circuit is also connected to a first node, the second voltage line, a third node, a first clock signal line, a fourth node, an input terminal and a second clock signal line respectively, is configured to control to connect or disconnect the third node and the second voltage line under control of a potential of the first node, control to connect or disconnect the third node and the first clock signal line under control of a potential of the fourth node, control the potential of the fourth node according to a potential of the third node, and control to connect or disconnect the input terminal and the first output node under control of a second clock signal provided by the second clock signal line, control to connect or disconnect the input terminal and the fourth node under control of the second clock signal, and control the potential of the first output node under control of the potential of the fourth node.

2. The driving circuit according to claim 1, wherein the first energy storage circuit includes a first capacitor;

a first electrode plate of the first capacitor is electrically connected to the first output node, and a second electrode plate of the first capacitor is electrically connected to the driving signal output terminal;

the second energy storage circuit includes a sixth capacitor;

a first electrode plate of the sixth capacitor is electrically connected to the second output node, and a second electrode plate of the sixth capacitor is electrically connected to the second voltage line.

3. The driving circuit according to claim 2, wherein the first capacitor includes a first electrode plate and a second electrode plate;

the first electrode plate includes a first electrode plate part and a second electrode plate part that are electrically connected to each other;

the first electrode plate part is formed on a first metal layer, the second electrode plate is formed on a second metal layer, the second electrode plate part is formed on a third metal layer, and the second metal layer is arranged between the first metal layer and the third metal layer;

the sixth capacitor includes a first electrode plate and a second electrode plate;

the first electrode plate of the sixth capacitor is formed on the first metal layer, and the second electrode plate of the sixth capacitor is formed on a fifth metal layer, wherein the first metal layer is a first gate metal layer, the second metal layer is a first source-drain metal layer, the third metal layer is a second source-drain metal layer, and the fifth metal layer is a second gate metal layer.

4. The driving circuit according to claim 2, wherein the first capacitor includes a first electrode plate and a second electrode plate; the sixth capacitor includes a first electrode plate and a second electrode plate;

the first electrode plate of the first capacitor is formed on a fourth metal layer, and the second electrode plate of the first capacitor is formed on a fifth metal layer;

the first electrode plate of the sixth capacitor is formed on the fourth metal layer, and the second electrode plate of the sixth capacitor is formed on the fifth metal layer, wherein the fourth metal layer is a first gate metal layer, and the fifth metal layer is a second gate metal layer.

5. The driving circuit according to claim 1, wherein the first energy storage circuit includes a second capacitor and a third capacitor;

a first electrode plate of the second capacitor is electrically connected to the first output node, and a second electrode plate of the second capacitor is electrically connected to a connection node;

a first electrode plate of the third capacitor is electrically connected to the connection node, and a second electrode plate of the third capacitor is electrically connected to the driving signal output terminal.

6. The driving circuit according to claim 5, further comprising a connection node control circuit; wherein the connection node control circuit is respectively connected to the first node, the second voltage line, a first node of an adjacent previous stage, the connection node, a second node, the first clock signal line, the second output node and the first output node, is configured to control to connect or disconnect the connection node and the second voltage line under the control of a potential of the first node and a potential of the first node of the adjacent previous stage, control to connect or disconnect the connection node and the second node under control of a first clock signal provided by the first clock signal line, and control to connect or disconnect the connection node and the second node under the control of the potential of the second output node, and control to connect or disconnect the second node and the first clock signal line under the control of the potential of the first output node.

7. The driving circuit according to claim 6, wherein the connection node control circuit includes a first transistor, a second transistor, a third transistor, a fourth transistor and a fifth transistor;

a gate electrode of the first transistor is electrically connected to the first node, a first electrode of the first transistor is electrically connected to the second voltage line, and a second electrode of the first transistor is electrically connected to a first electrode of the third transistor;

a gate electrode of the second transistor is electrically connected to the first output node, a first electrode of the second transistor is electrically connected to the second node, and a second electrode of the second transistor is electrically connected to the first clock signal line;

a gate electrode of the third transistor is electrically connected to the first node of the adjacent previous stage, and a second electrode of the third transistor is electrically connected to the connection node;

a gate electrode of the fourth transistor is electrically connected to the first clock signal line, a first electrode of the fourth transistor is electrically connected to the connection node, and a second electrode of the fourth transistor is electrically connected to the second node;

a gate electrode of the fifth transistor is electrically connected to the second output node, a first electrode of the fifth transistor is electrically connected to the connection node, and a second electrode of the fifth transistor is electrically connected to the second node;

the first output node control circuit includes a sixth transistor;

a gate electrode of the sixth transistor is electrically connected to the second clock signal line, a first electrode of the sixth transistor is electrically connected to the input terminal, and a second electrode of the sixth transistor is electrically connected to the first output node.

8. The driving circuit according to claim 1, wherein the first energy storage circuit includes a first capacitor, a second capacitor and a third capacitor;

a first electrode plate of the first capacitor is electrically connected to the first output node, and a second electrode plate of the first capacitor is electrically connected to the driving signal output terminal;

a first electrode plate of the second capacitor is electrically connected to the first output node, and a second electrode plate of the second capacitor is electrically connected to a connection node;

a first electrode plate of the third capacitor is electrically connected to the connection node, and a second electrode plate of the third capacitor is electrically connected to the driving signal output terminal.

9. The driving circuit according to claim 1, wherein the first output node control circuit includes a first transistor, a second transistor, a fourth capacitor, a sixth transistor, a seventh transistor and an eighth transistor;

a gate electrode of the first transistor is electrically connected to the first node, a first electrode of the first transistor is electrically connected to the second voltage line, and a second electrode of the first transistor is electrically connected to the third node;

a gate electrode of the second transistor is electrically connected to the fourth node, a first electrode of the second transistor is electrically connected to the third node, and a second electrode of the second transistor is electrically connected to the first clock signal line;

a first electrode plate of the fourth capacitor is electrically connected to the third node, and a second electrode plate of the fourth capacitor is electrically connected to the fourth node;

a gate electrode of the sixth transistor is electrically connected to the second clock signal line, a first electrode of the sixth transistor is electrically connected to the input terminal, and a second electrode of the sixth transistor is electrically connected to the first output node;

a gate electrode of the seventh transistor is electrically connected to the second clock signal line, a first electrode of the seventh transistor is electrically connected to the input terminal, and a second electrode of the seventh transistor is electrically connected to the fourth node;

a gate electrode of the eighth transistor and a first electrode of the eighth transistor are electrically connected to the fourth node, and a second electrode of the eighth transistor is electrically connected to the first output node.

10. The driving circuit according to claim 9, wherein the first output node control circuit further includes a ninth transistor;

a second electrode of the seventh transistor is electrically connected to the fourth node through the ninth transistor;

a gate electrode of the ninth transistor is electrically connected to a third voltage line, a first electrode of the ninth transistor is electrically connected to the second electrode of the seventh transistor, and a second electrode of the ninth transistor is electrically connected to the fourth node.

11. The driving circuit according to claim 9, wherein the first output node control circuit further includes a tenth transistor;

the second electrode of the sixth transistor is electrically connected to the first output node through the tenth transistor;

a gate electrode of the tenth transistor is electrically connected to a third voltage line, a first electrode of the tenth transistor is electrically connected to a fifth node, and a second electrode of the tenth transistor is electrically connected to the first output node;

the second electrode of the sixth transistor is electrically connected to the fifth node.

12. The driving circuit according to claim 1, further comprising a first node control circuit; wherein the first node control circuit is electrically connected to the first node, the second clock signal line, a first voltage line and the first output node respectively, and is configured to control to connect or disconnect the first node and the first voltage line under the control of the second clock signal provided by the second clock signal line, and control to connect or disconnect the first node and the second clock signal line under control of the first output node.

13. The driving circuit according to claim 12, wherein the first node control circuit includes an eleventh transistor and a twelfth transistor;

a gate electrode of the eleventh transistor is electrically connected to the second clock signal line, a first electrode of the eleventh transistor is electrically connected to the first voltage line, and a second electrode of the eleventh transistor is electrically connected to the first node;

a gate electrode of the twelfth transistor is electrically connected to the first output node, a first electrode of the twelfth transistor is electrically connected to the second clock signal line, and a second electrode of the twelfth transistor is electrically connected to the first node.

14. The driving circuit according to claim 12, wherein:

the second output node control circuit is also electrically connected to the first node, the first clock signal line, a sixth node, the second voltage line and the first output node respectively, is configured to control to connect or disconnect the sixth node and the first clock signal line under the control of the potential of the first node, control a potential of the sixth node according to the potential of the first node, control to connect the sixth node and the second output node and maintain the potential of the second output node under control of a first clock signal provided by the first clock signal line, and control to connect or disconnect the second output node and the second voltage line under the control of the potential of the first output node.

15. The driving circuit according to claim 14, wherein the second output node control circuit includes a thirteenth transistor, a fourteenth transistor, a fifth capacitor and a fifteenth transistor;

a gate electrode of the thirteenth transistor is electrically connected to the first node, a first electrode of the thirteenth transistor is electrically connected to the first clock signal line, and a second electrode of the thirteenth transistor is electrically connected to the sixth node;

a gate electrode of the fourteenth transistor is electrically connected to the first clock signal line, a first electrode of the fourteenth transistor is electrically connected to the sixth node, and a second electrode of the fourteenth transistor is electrically connected to the second output node;

a first electrode plate of the fifth capacitor is electrically connected to the gate electrode of the thirteenth transistor, and a second electrode plate of the fifth capacitor is electrically connected to the sixth node;

a gate electrode of the fifteenth transistor is electrically connected to the first output node, a first electrode of the fifteenth transistor is electrically connected to the second output node, and a second electrode of the fifteenth transistor is electrically connected to the second voltage line.

16. The driving circuit according to claim 15, wherein the first output node control circuit includes a sixteenth transistor;

a gate electrode of the sixteenth transistor is electrically connected to a control signal line, a first electrode of the sixteenth transistor is electrically connected to the second voltage line, and a second electrode of the sixteenth transistor is electrically connected to the first output node, or the driving circuit further comprises a seventeenth transistor; wherein the first node is electrically connected to the gate electrode of the thirteenth transistor through the seventeenth transistor;

a gate electrode of the seventeenth transistor is electrically connected to a third voltage line, a first electrode of the seventeenth transistor is electrically connected to the first node, and a second electrode of the seventeenth transistor is electrically connected to the gate electrode of thirteenth transistor.

17. The driving circuit according to claim 14, wherein the output circuit includes an output transistor, and the output reset circuit includes an output reset transistor;

a gate electrode of the output transistor is electrically connected to the second output node, a first electrode of the output transistor is electrically connected to the second voltage line, and a second electrode of the output transistor is electrically connected to the driving signal output terminal;

a gate electrode of the output reset transistor is electrically connected to the first output node, a first electrode of the output reset transistor is electrically connected to the driving signal output terminal, and a second electrode of the output reset transistor is electrically connected to the first voltage line.

18. A display device comprising the driving circuit according to claim 1.

19. A driving method, applied to a driving circuit, wherein the driving circuit comprises a first output node control circuit, an output reset circuit, a second output node control circuit, an output circuit, a first energy storage circuit, a second energy storage circuit, and a driving signal output terminal; wherein the first output node control circuit is electrically connected to a first output node and is configured to control a potential of the first output node;

the second output node control circuit is electrically connected to a second output node and is configured to control a potential of the second output node;

the output reset circuit is electrically connected to the first output node, the driving signal output terminal and a first voltage line respectively, and is configured to control to connect the driving signal output terminal and the first voltage line under control of the potential of the first output node;

the output circuit is electrically connected to the second output node, the driving signal output terminal and a second voltage line respectively, and is configured to control to connect the driving signal output terminal and the second voltage line under control of the potential of the second output node;

the first energy storage circuit is electrically connected to the first output node and the driving signal output terminal respectively, and the second energy storage circuit is electrically connected to the second output node and the second voltage line respectively, and the first energy storage circuit and the second energy storage circuit are configured to store electric energy;

wherein the first output node control circuit is also connected to a first node, the second voltage line, a third node, a first clock signal line, a fourth node, an input terminal and a second clock signal line respectively, is configured to control to connect or disconnect the third node and the second voltage line under control of a potential of the first node, control to connect or disconnect the third node and the first clock signal line under control of a potential of the fourth node, control the potential of the fourth node according to a potential of the third node, and control to connect or disconnect the input terminal and the first output node under control of a second clock signal provided by the second clock signal line, control to connect or disconnect the input terminal and the fourth node under control of the second clock signal, and control the potential of the first output node under control of the potential of the fourth node;

the driving method comprises:

controlling, by the first output node control circuit, the potential of the first output node;

controlling, by the second output node control circuit, the potential of the second output node;

controlling, by the output reset circuit, to connect the driving signal output terminal and the first voltage line under the control of the potential of the first output node;

controlling, by the output circuit, to connect the driving signal output terminal and the second voltage line under the control of the potential of the second output node;

controlling, by the first energy storage circuit, the potential of the first output node according to a driving signal provided by the driving signal output terminal; maintaining, by the second energy storage circuit, the potential of the second output node.

* * * * *